United States Patent [19]
Ohira et al.

[11] Patent Number: 5,845,089
[45] Date of Patent: Dec. 1, 1998

[54] MULTIMEDIA INFORMATION PROCESSING APPARATUS

[75] Inventors: Hideo Ohira; Tokumichi Murakami; Yoshiaki Kato; Kazuhiro Matsuzaki, all of Tokyo, Japan

[73] Assignee: Mitsubishi Denki Kabushiki Kaisha, Tokyo, Japan

[21] Appl. No.: 655,885

[22] Filed: May 31, 1996

[30] Foreign Application Priority Data

Aug. 3, 1995 [JP] Japan ..................................... 7-198388

[51] Int. Cl.⁶ ................................................... H04N 1/413
[52] U.S. Cl. ...................... 395/200.77; 370/352; 370/355
[58] Field of Search ........................ 395/200.77; 370/352, 370/355, 395, 381

[56] References Cited

U.S. PATENT DOCUMENTS 5,511,054 4/1996 Oishi et al. ................................ 369/59
5,541,919 7/1996 Yong et al. ............................... 370/416
5,612,956 3/1997 Walker et al. ........................... 370/545
5,671,226 9/1997 Murakami et al. .

*Primary Examiner*—Thomas Peeso
*Attorney, Agent, or Firm*—Wolf, Greenfield & Sacks, P.C.

[57] ABSTRACT

A multimedia information processing apparatus comprises information source processing portions, element packet processing portions, packet processing portions, transmission path processing portions, an information source processing portion bus, an element packets processing bus and a packet multiplexing bus. A multimedia information processing apparatus is divided into a plurality of layers, and interface signals are defined between each processing portion and each processing is connected via buses. Contents such as broadcasting, communication and storage are secured by an editing unit comprised of a computer and by expansion of units via bus. Bus connection enables editing processing portions such as a complex processing portion including a plurality of processing portions and a computer to expand functions of a multimedia information processing apparatus.

15 Claims, 14 Drawing Sheets

MULTIMEDIA INFORMATION PROCESSING APPARATUS

BACKGROUND OF THE INVENTION

1. Field of the Invention

The invention relates to a multimedia information processing system which encodes, multiplexes, transmits or stores digitized video, audio and the other data, or receives a transmission signal or reads a recorded signal, and separates and encodes the multiplexed signal and reproduces the video, audio and other data. The invention is practically applied to a video on demand (VOD), a digital broadcasting system, a TV conference system and so on.

2. Description of the Prior Art

FIG. 14 is, for example, a construction diagram of a multimedia information processing apparatus disclosed in a paper titled "A codec used for satellite broadcasting quality", by Hattori, Tanaka, Asano, Asai and Sakado, Mitsubishi Denki Giho VOL. 1.67, No 7, pp. 33–38, 1993.

In FIG. 14, a conventional media multiplexing portion 130 multiplexes a plurality of encoded bit sequences 240 outputted from a plurality of ES processing means 101 which process information sources such as digitized video and audio. The conventional media multiplexing portion 130 also generates a multiplexing bit sequence 241. A conventional transmission processing portion 131 scrambles the multiplexing bit sequence 241 and adds error correction codes, and carries out assembling of a transmission frame, modulation processing and so on and generates a transmission signal 206.

Next, an operation of a transmission side in the conventional multimedia information processing apparatus is explained below. The ES processing portions 101 reduce redundant components of many kinds of signals using various encoding means, and encode information sources, and generate the encoding sequences 240 which are added by additional information such as a synchronization signal of a video and audio, a control signal and so on.

The conventional media multiplexing portion 130 multiplexes the encoding sequences 240a, 240b and 240n outputted from a plurality of ES processing portions 101.

The conventional transmission processing portion 131 scrambles the multiplexing bit sequences 241 according to kinds and characteristics of the transmission path and applications, adds error correction codes, and carries out assembling of transmission frames, modulation processing and so on and generates the transmission signal 206.

Since the conventional multimedia information processing system is constructed as described above, contents in each processing means and interface signals between each processing means are assigned fixedly according to the system. Therefore, the system lacks the general purpose and it is difficult to give a service such as data exchange between broadcasting, communication, computer and storage, and to provide a hardware construction and to add other processings.

The invention aims to solve the above described problem. In a service handling different kinds of media such as broadcasting, communication and storage, the invention provides a multimedia information processing apparatus which can supply with added value between each service. With respect to hardwares, the present invention provide a multimedia information processing apparatus which provides service timely by providing an expanded system using bus connection and by adding hardwares in a short time.

SUMMARY OF THE INVENTION

According to one aspect of the invention, a multimedia information processing apparatus of the present invention comprises, an information source processing means for encoding a media signal outputted from media for every media and for transmitting the media signal to a first bus as an information source encoded bit sequence; an element packet processing means for receiving the information source encoded bit sequence from the first bus and for transmitting element packets which are added by a first sub-information including a media identification, a reproduction synchronization, a packet synchronization and so on to a second bus; a multiplex processing means for generating fixed length packets added by second sub-information including a packet identification and a reference time by dividing the element packets inputted from the second bus, and for transmitting any one of a first multiplexed stream multiplexed by fixed length packets or a second multiplexed stream multiplexed by the element packets and added by the second sub-information to a third bus; a transmission path processing portion for outputting the first or second multiplexed stream inputted from the third bus to a transmission path as a transmission signal according to a transmission media; and a control means for managing states of the buses from the first to the third and controlling the processing means.

According to another aspect of the invention, a multimedia information processing apparatus of the present invention comprises, a transmission path processing means, when a transmission signal outputted from a transmission media is received via transmission paths, for decoding the transmission signal according to characteristics of the transmission path, and for transmitting any one of a first multiplexed stream or a second multiplexed stream to a third bus, the first multiplexed stream is multiplexed by fixed length packets which are assembled by adding second sub-information including a packet identification and a reference time to the decoded transmission signal, and the second multiplexed stream is formed by multiplexing the element packets for every media and by adding the second sub-information; a multiplex packet processing means for transmitting the element packets to a second bus, the element packets are formed by inputting and separating the multiplexed stream from the third bus, and adding a first sub-information including a media identification, a reproduction synchronization and a packet synchronization to the separated stream; an element packet processing means for inputting the element packets from the second bus, separating the first sub-information and transmitting an information source encoded bit sequence to a first bus; an information source processing means for inputting the information source encoded bit sequence to a first bus, encoding it for every media and for transmitting an information source data to the media; and a control means for managing states of the buses from the first to the third and for controlling each processing means.

According to further aspect of the invention, a multimedia information processing apparatus of the present invention further comprises, an information source processing means for encoding a media signal outputted from media for every media and for transmitting the media signal to a first bus as an information source encoded bit sequence, and when the information source encoded bit sequence is inputted from the first bus, for decoding an information source bit sequence for every media and transmitting them to the first bus; an element packet processing means, when the information source encoded bit sequence is received from the first bus, for transmitting element packets, which are added by a first sub-information including a media identification, a reproduction synchronization, a packet synchronization and so on, to a second bus, and when the element packets are inputted from the second bus, for separating the first sub-information from the element packets and transmitting the information source encoded bit sequence to said first bus; a multiplex packet processing means, when the element packets inputted from the second bus, for disassembling the element packets and generating fixed length packets added by second sub-information including a packet identification and a reference time, and for transmitting any one of a first multiplexed stream multiplexed by the fixed length packets or a second multiplexed stream multiplexed by the element packets and added by the second sub-information, to a third bus, when any one of the first or second multiplex stream is inputted from the third bus, for separating the first or second multiplexed stream and generating the element packets and for transmitting the element packets to a second bus, a transmission path processing portion when the first or second multiplexed stream is inputted from the third bus, or outputting the first or second multiplexed stream to a transmission path as a transmission signal according to the transmission media, when a transmission signal outputted from a transmission media is received via transmission paths, for decoding the transmission signal according to characteristics of the transmission path, and for generating fixed length packets which are assembled by adding sub-information including a packet identification and a reference time to the decoded transmission signal, and for transmitting the multiplexed stream to the third bus; a control means for managing states of the buses from the first to the third and controlling the processing means.

According to further aspect of the invention, a multimedia information processing apparatus of the present invention comprises, at least any of a plurality of information source processing means, a plurality of element packet processing means, a plurality of multiplexing packet processing means and a plurality of transmission path processing means.

According to further aspect of the invention, a multimedia information processing apparatus of the present invention comprises, data format of signals transmitted to the buses from the first to the third is defined for every bus.

According to further aspect of the invention, a multimedia information processing apparatus of the present invention further comprises, a complex processing means which comprises at least two processing means among an information source processing means, an element packet processing means, a multiplexing packet means and a transmission path processing means; wherein the complex processing means is connected to at least one of the buses from the first to the third.

According to further aspect of the invention, a multimedia information processing apparatus of the present invention further comprises, an editing processing means for inputting data from any of the buses from the first to the third, for editing the inputted data and for transmitting the edited data to the buses from the first to the third by a data format being appropriate to any of the buses.

According to further aspect of the invention, a multimedia information processing apparatus of the present invention further comprises, an editing processing means connected to at least two buses among the buses from the first to the third, for editing the data inputted from one of the buses, and for converting the edited data into another data format being appropriate to the another bus, and for transmitting the edited data to the another bus.

According to further aspect of the invention, a multimedia information processing apparatus of the present invention further comprises, a storage means for receiving and transmitting data from/to any of transmission path processing means and the buses from the first to the third.

According to further aspect of the invention, a multimedia information processing apparatus of the present invention further comprises, a plurality of multiplexing packet processing means; wherein the multiplexing packet processing means inputs element packets which are sent to the second bus by some other multiplexing packet processing means, and transmits a first or second multiplexed stream to a third bus.

According to further aspect of the invention, a multimedia information processing apparatus of the present invention further comprises, a plurality of transmission path processing means, when receiving a first or second multiplexed stream from the third bus, for transmitting the inputted multiplexed stream to a transmission path as a transmission signal according to a transmission media, and when receiving a transmission signal which is outputted from the transmission media via the transmission path, for decoding the transmission signal according to characteristics of the transmission media, and for transmitting the first or second multiplexed stream to a third bus, and the first or second multiplexed stream is received and transmitted between the transmission path processing means via the third bus.

According to further aspect of the invention, a multimedia information processing apparatus of the present invention comprises, wherein, the controlling means permits some of an information source processing means, an element packet processing means, a multiplexing packet processing means and a transmission processing means to operate in parallel provided that busses are not competed.

According to further aspect of the invention, a multimedia information processing apparatus of the present invention comprises, wherein a main bus is provided instead of the buses from the first to the third, to which an information source processing means, an element packet processing means, a multiplexing packet processing means and a transmission path processing means are connected; and the controlling means manages states of the main bus and controls each processing means.

According to further aspect of the invention, a multimedia information processing apparatus of the present invention comprises, wherein a main bus is provided instead of the buses from the first to the third, to which an information source processing means, an element packet processing means, a multiplexing packet processing means and a transmission path processing means are connected; and further comprising: an editing means which is connected to said main bus, the editing means edits data which are sent to the main bus from a complex processing means which carries out functions for an information source processing means and an element packet processing means, or from the information source processing means, and transmits edited data to the main bus; and the controlling means manages states of the main bus and controls each processing means.

According to further aspect of the invention, a multimedia information processing apparatus of the present invention comprises, wherein a main bus is provided instead of the buses from the first to the third, to which an information source processing means, an element packet processing means, a multiplexing packet processing means and a transmission path processing means are connected; and further comprising: a storage means for receiving and transmitting data between the main bus and any one of an information source processing means, an element packet processing means, a multiplexing packet processing and a transmission path processing means, via the main bus.

According to further aspect of the invention, a multimedia information processing apparatus of the present invention further comprises, at least a plurality of any one of an information source processing means, an element packet processing means, a multiplexing packet processing means and a transmission processing means, the plurality of processing means have the same functions; a control means for monitoring normal operation of each processing means, and switches to another processing means which has the same function as that of the failed processing means if any one of processing means is failed.

DETAILED DESCRIPTION OF THE PREFERRED EMBODIMENTS

Embodiment 1

Figure 1:
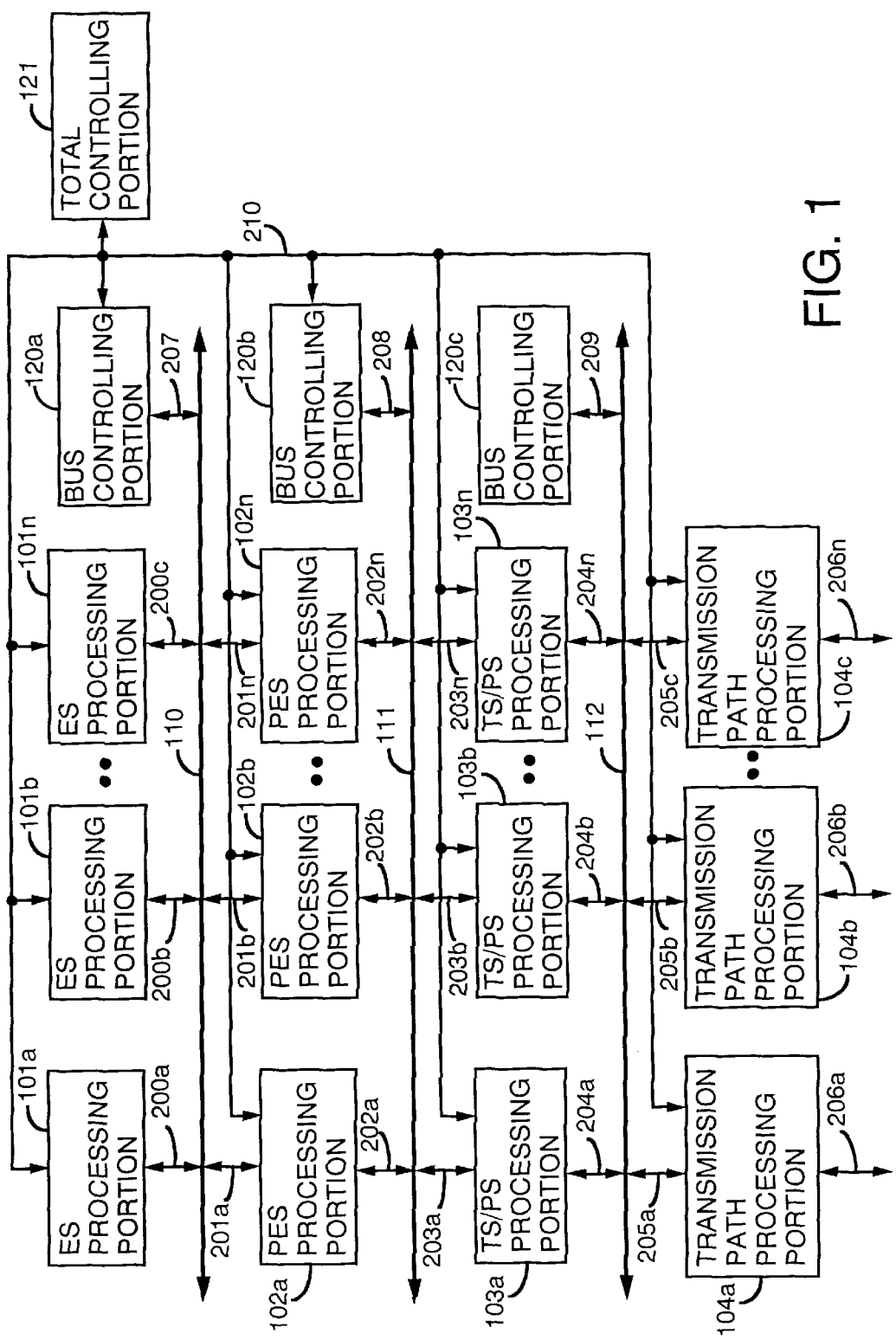
FIG. 1 is a block diagram showing a multimedia information processing apparatus of a first embodiment.

An embodiment of the invention is explained below using figures. FIG. 1 is a block diagram showing a multimedia information processing apparatus. The multimedia information processing apparatus comprises elementary stream (referred to as ES hereinafter) processing portions 101a, 101b, . . . , 101N which are information source processing means for processing an information source data such as digitized video and audio, packetized elementary stream (referred to as PES hereinafter) processing portions 102a, 102b, . . . , 102n which are element packet processing portions, transport stream/program stream (referred to as TS/PS hereinafter) processing portions 103a, 103b, . . . 103n which are multiplexing packet processing means, and transmission path processing portions 104a, 104b, . . . 104n which process the transmission line corresponding to transmission media such as a wire broadcasting, a satellite broadcasting and a land wave transmission.

The multimedia information processing apparatus further comprises a TS/PS bus 110 for connecting the ES processing portions 101 with the PES processing portions 102 and for carrying out two-way communication, a PES bus 111 for connecting the PES processing portions 102 with the TS/PS processing portions 103 and for carrying out two-way communication, a TS/PS by 112 for connecting the TS/PS processing portions 103 with the transmission path processing portions 104 and for carrying out two-way communication, and a total controlling portion 121.

The multimedia information processing apparatus further comprises signal lines 200a, 200b, . . . 200n for connecting the ES processing portions 101 with ES bus 110, signal lines 201a, 201b, . . . 201n for connecting the ES bus 110 with the PES processing portions 102, connection lines 202a, 202b, . . . 202n for connecting the PES processing portions 102 with the PS bus 111, connection lines 203a, 203b, . . . 203n for connecting the PS bus 111 with the TS/PS processing portions 103, connection lines 204a, 204b, . . . 204n for connecting the TS/P processing portions 103 with the TS/PS bus 112 and connection lines 205a, 205b, . . . 205n are for connecting the TS/PS bus 112 with the transmission path processing portions 104. The multimedia information processing apparatus further comprises output data 206a, 206b, . . . 206n outputted to the transmission path and a control signal 207 of the ES bus 110, a control signal 208 of the PES bus 111, a control signal 209 of the TS/PS bus 112 and a control signal 210 of the total controlling portion 210.

Figure 2:
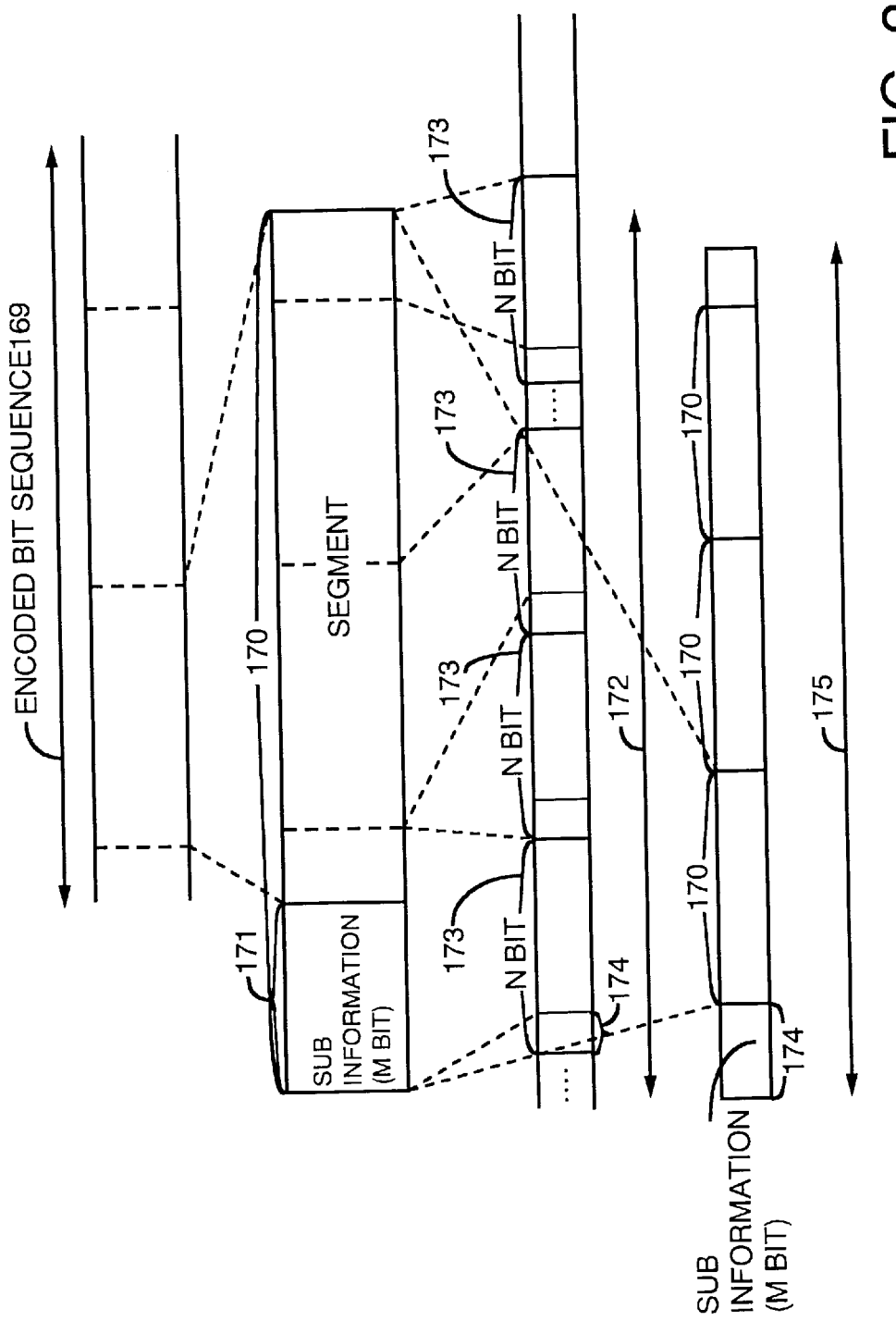
FIG. 2 is an illustration explaining a signal format in a bus of the multimedia information processing apparatus.

FIG. 2 shows a signal form of each bus as shown in FIG. 1. FIG. 2 comprises an information source encoded information source bit sequence 169 which flows in the ES bus 110, an element packet PES 170 which flows in the PES bus 111, a sub-information 171 of the PES 170, TS 172 which flows in the TS/PS bus 112, TS packet 173 which forms the TS 172 and having fixed length, a sub-information 174 of the TS packet 173. Since the sub-information 174 is added by a packet identifier, reference time, channel information and so on, the TS packets 173 are not necessarily the same media. Therefore, the TS packet 172 comprised of the sub-information 174 and the TS packet 173 is mainly used to transmit to the media. Further, a PS 175 is comprised of the PES 170 which is included in the same media as the sub-information 174 and is mainly used to store the data into memory means. The data format of each signal transmitted to the ES bus 110, PES bus 111 and TS/PS bus 112 is defined for every bus.

An operation is explained using figures. The ES processing portions 101 take in media signals which are outputted from many kinds of media such as a video equipment, an audio equipment and the data processing portion, and encode the media signals of the information source for every unit media. The ES processing portions 101 then generates an encoded information source bit sequence 169 for every unit media and transmits the encoded information source bit sequence 169 to the ES bus 110 via the signal lines 200, or decodes the encoded information source bit sequence 169 received from the ES bus 110 via the signal lines 200 for every unit media to the many kinds of media.

The PES processing portions 102 receive the encoded information source bit sequence 169 from the ES bus 110, disassembles it according to a predetermined frame or a predetermined time and generate a segment. The PES processing portions 102 then add the sub-information 171 for carrying out media identification, packet synchronization, reproduction synchronization to each segment, and generate the PES 170 having a signal form which is compatible with other system and transmit the PES 170 to the PES bus 111. The PES processing portions 102 further process the PES 170 received from the PES bus 111 via the signal line 202 in a predetermined manner, and decode the encoded information source bit sequence 169 and transmits the encoded information source bit sequence 169 to the ES bus 110.

In case that the TS/PS processing portions 103 generate the TS 172, the TS/PS processing portions 103 add the disassembled sub-information 174 such as a media identification, a reference time and a channel information, to the PES 170 received from the PES bus 111 via the signal lines 203 to generate and multiplex the fixed length TS packets 173 during adjusting the speed, and then generate the TS 172 having the signal form compatible with other system and transmit the TS 172 to the TS/PS bus 112 via the signal lines 204. In case of separating the TS 172, the TS/PS processing portions 103 separate the TS 172 received from the TS/PS bus 112 via the signal lines 204 to the TS packet 173 which are elements of the TS 172, and reproduce the PES 170 for every media and transmit the PES 170 to PES bus via the signal lines 203.

In case that the TS/PS processing portions 103 generate the PS 175, the TS/PS processing portions 103 add the sub-information 174 such as a media identification, a reference time and so on to a plurality of PES 170 received from the PES bus 111 via signal lines 203 and generates the variable length PS 175. In case of separating the PS 175, the TS/PS processing portions 103 separate the PS 175 received from the TS/PS bus via the signal lines 204 to the PES packets 170 which are elements of the PS 175 and transmit the PES 170 to the PES bus 111 via the signal lines 203.

The transmission line processing portions 104 generate and transmit a transmission signal 206 by processing TS 172 or the PES 170 received from TS/PS bus 112 via the signal lines 205 according to the transmission media such as a wire transmission, a satellite transmission and a land wave transmission. The transmission line processing portions 104 further receive the transmission signal 206 and reproduce the TS 172 and transmit the TS 172 to the TS/PS bus 112 via the signal lines 205.

The bus controlling portion 120a manages states of ES bus 110 and reports control information to the total controlling portion 121.

The bus controlling portion 120b manages states of the PES bus 111 and reports management information to the total controlling portion 121.

The bus controlling portion 120c manages states of the TS/PS bus 112 and reports control information to the total controlling portion 121.

The total controlling portion 121 receives states of the ES bus 110 from the bus controlling portion 120a via the connection line 210c, also receives states of the PES bus 111 from the bus controlling portion 120b via the connection line 210 and further receives states of the PES bus 112 from the bus controlling portion 120c via the connection line 210, then reports whether each bus can be available to the processing portion used, the bus controlling portion 120a, the bus controlling portion 120b or the bus controlling portion 120c.

By constructing the multimedia information processing apparatus as mentioned above, it is possible to connect a plurality of ES processing portions 101 and PES processing portions 102 to the ES bus 110. It is also possible to connect a plurality of PES processing portions 102 and TS/PS processing portions 103 to the PES bus 111. It is further possible to connect a plurality of TS/PS processing portions 103 and transmission processing portions 104 to the TS/PS bus 112. From the process for encoding the data via the information source to the process for transmitting them to the transmission line, or from the process for receiving data via the transmission line to the process for decoding them to the information source, the ES processing portions 101, the PES processing portions 102 and the TS/PS processing portions 103 are classified into layers and each layer is coupled by the bus. Therefore, it is possible to simplify hardwares at the same time to extend the apparatus and also possible to mutually exchange data between services such as broadcasting, communication, computer and storage having different bit rate sequences.

In the embodiment, information source data such as the video and the audio which are digitized as a multimedia information processing apparatus are processed in the ES processing portion 101. In the present embodiment, there are two directions, one of which is that the TS 172 or PS 175 are transmitted from the transmission processing portions 104 to the transmission media such as a wired transmission, a satellite transmission and a land wave transmission, and another of which is that the transmission signal 206 is received from the transmission processing portions 104 and the TS 172 is reproduced and sent to the ES processing portions 101 as a coding bit sequence 169. In the above embodiment, an example is explained which has both direction, but only one direction may be also possible.

Embodiment 2

Figure 3:
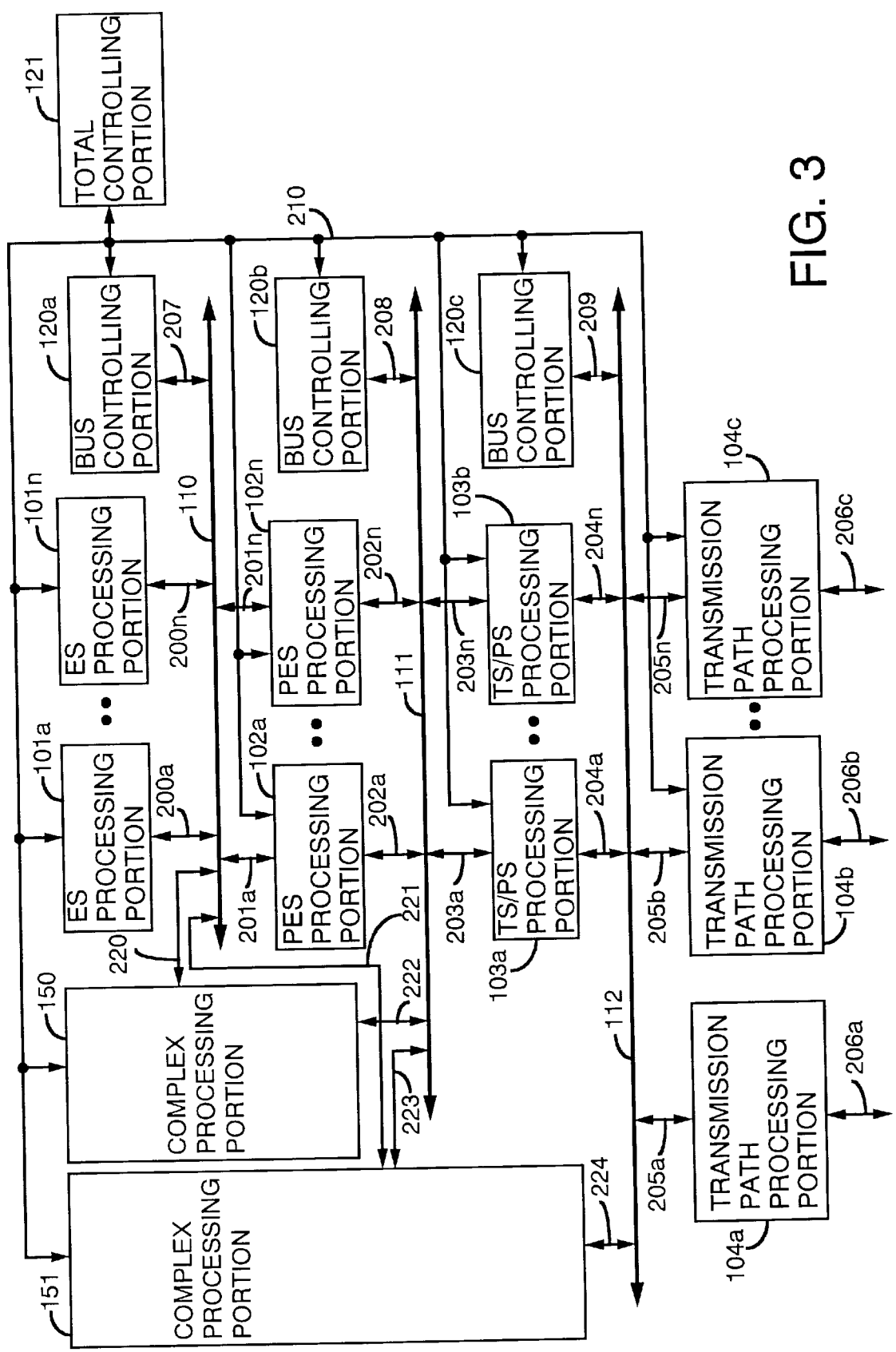
FIG. 3 is a block diagram showing a multimedia information processing apparatus of a second embodiment.

Next, one example of the multimedia information processing apparatus which comprises a complex processing portion having functions such as the ES processing portions 101, the PES processing portions 102, the TS/PS processing portions 103 and so on, is explained below. FIG. 3 is a block diagram showing a multimedia information processing apparatus of the second embodiment. The elements having the same reference numbers in FIG. 3 are the same portions or the corresponding portions in FIG. 1. Accordingly the detailed explanation of the same portions is omitted. The multimedia information processing apparatus of FIG. 3 comprises a complex processing portion 150 having processing functions such as the ES processing portions 101 and the PES processing portions 102, a complex processing portion 151 having processing functions such as the ES processing portions 101, the PES processing portions 102 and the TS/PS processing portions 103. The multimedia information processing apparatus further comprises a connection line 220 which connects the ES processing portion 150 with the ES bus 110, a connection line 222 which connects the complex processing portion 150 with the PES bus 111, a connection line 223 which connects the complex processing portion 151 with the PES bus 111 and a connection line 224 which connects the complex processing portion 151 with the TS/PS bus 112.

Next, an operation is explained using FIG. 3. The complex processing portion 151 has, for example, complex functions derived from the operations of the PES processing portions 101 having an input means comprising a camera and a microphone and a decoding means, the PES processing portions 102 for adding sub-information in order to carry out reproduction synchronization, and from the operations of the TS/PS processing portions 103 which assemble fixed length TS packets 173 including the sub-information such as the reference time. The complex processing portion 151 an input/output system which enables to access to the ES bus 110, the PES bus 111 and the TS/PS bus 112. The complex processing portion 150 also includes an input/output system which enables to access to the ES bus 110 and the PES bus 111.

For example, in case that an image signal encoded in the complex processing portion 151 is decoded in other ES processing portion 101n, to display it on a monitor included in the ES processing portion 101n, or in case that a sound encoded in the complex processing portion 151 is decoded in other complex processing portion 101a to output it from a loudspeaker, an image and sound data are encoded in the ES processing portion included in the complex processing portion 151 and transmitted to the ES bus 110 via the connection line 221 without passing the PES processing portion and the TS/PS processing portion in the complex processing portion 151. The ES processing portion 101n receives image data transmitted to the ES bus 110 via the connection line 200n, and decodes the received data to display on the monitor. The ES processing portion 101a decodes the sound data transmitted to the ES bus 110 to output them from the speaker.

In case that the complex processing portion 151 transmits an encoded image signal and sound signal to the transmission line 206a via the transmission processing portion 104a, the complex processing portion 151 transmits data which are assembled into packets to TS/PS bus 112 via the connection line 224 after processed in the TS/PS processing portion, PES processing portion, TS/PS processing portion in the complex processing portion 151. The transmission processing portion 104a receives the packet data via TS/PS bus 112 and the connection line 205a, and processes them to signals which are appropriate to the transmission line and transmits them to the transmission line via the connection line 206a.

In case that the complex processing portion 150 transmits an encoded image signal and sound signal to the transmission line 206a via the transmission processing portion 104a, the complex processing portion 150 transmits PES 170 shown in FIG. 2 which are assembled into packets to PES bus 111 via the connection line 222 after processed in the ES processing portion, PES processing portion in the complex processing portion 150. The transmission processing portion 104a receives the packet data via TS/PS bus 112 and the connection line 205a, and processes them to signal form which is appropriate to the transmission line and transmits them to the transmission line via the connection line 206a.

As described above, in the multimedia information processing apparatus of the second embodiment, the complex processing portion 150 and the complex processing portion 151 can transmit and receive data which flow in each bus and process them. Therefore, since the complex processing portion 150, the complex processing portion 151 can be connected completely with other ES processing portions 101, PES pressor 102 and TS/PS processing portions 103, processes of the system have more flexibility and more extensibility. By caring out a plurality of processes in the complex processing portion 150 and in the decoding pressor 151, common buses are used for very limited times, which makes it possible for buses to get higher efficient.

In the embodiment 2, although an example of a multimedia information processing apparatus is explained which has two complex processing portions 150 and 151, any one of them can be provided.

Embodiment 3

Figure 4:
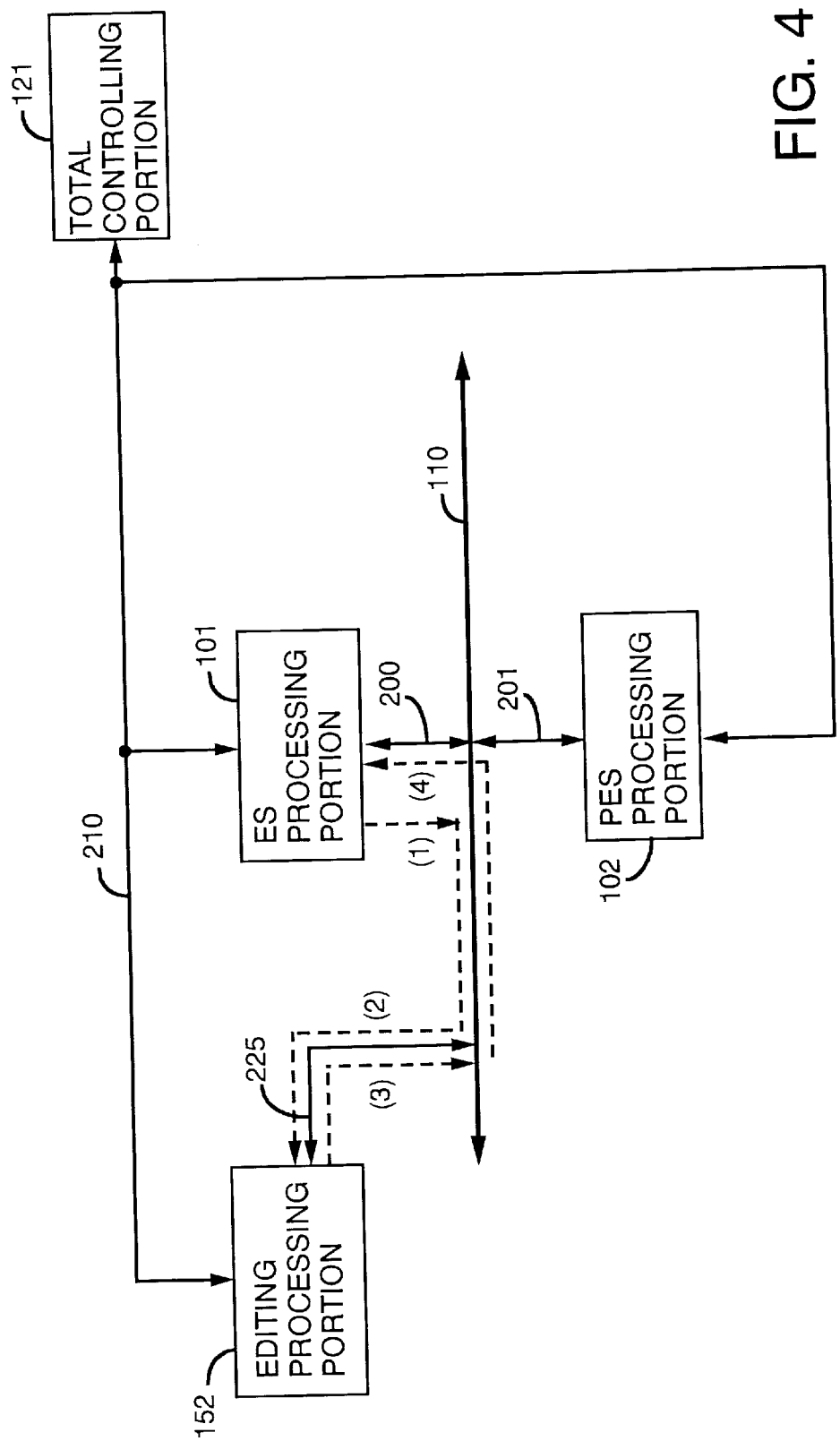
FIG. 4 is a block diagram showing a multimedia information processing apparatus of a third embodiment.

Next, a third embodiment of a multimedia information processing apparatus is explained which has an editing processing portion. FIG. 4 is a block diagram showing a multimedia information processing apparatus of the third embodiment. The elements having the same reference numbers in FIG. 4 are the same portions or the corresponding portions in FIG. 1. Accordingly the detailed explanation of the same portions is omitted. In FIG. 4, the multimedia information processing apparatus comprises an editing processing portion 152 comprised of a computer, a connection line 225 which connects the TS/PS bus 110 with the editing processing portion 152.

Next, an operation of the third embodiment is explained below. For example, in case that the ES processing portions 101, which comprises an input means such as a camera, an encoding means which encodes the inputted data, a decoding means which decodes the encoded data and a display means such as a monitor, encodes data from the camera, transmits the encoded data to the editing processing portion 152, and the editing processing portion 152 enlarges or reduces images therein and transmits the processed data to the ES processing portions 101, and then the ES processing portions 101 displays the decoded data in the monitor in the ES processing portions 101, the ES processing portions 101 encodes the image data from the camera and transmits the data to the ES bus 110 in response to the total controlling portion 121, according to a predetermined format as shown by an arrow (1) in FIG. 4.

Next, the editing processing portion 152 receives the data from the ES bus 110 via the route (2) in FIG. 4, and decodes the received data, then re-encodes the data after editing process such as a predetermined enlargement and reduction, and then transmits the data to the ES bus 110 via the route (3) in FIG. 4 in response to the instruction from the total controlling portion 121 according to a predetermined format.

Next, the ES processing portions 101 receives the data from the ES bus 110 via the arrow (4) in FIG. 4, encodes the data and displays them in the monitor. According to a series of processes, the ES processing portions 101 can display the image, which are enlarged or reduced from the image taken by the camera in the ES processing portions 101, on the monitor in the ES processing portion 101.

As described above, in the multimedia information processing apparatus of the second embodiment, the editing processing portion 152 can be connected to the ES processing portions 101, or the editing processing portion 152 can be connected to the PES processing portions 102. Therefore, it is possible to extend the editing function easily. It is further possible to get more flexible image by providing the editing processing portion which performs various specific effects.

Embodiment 4

Figure 5:
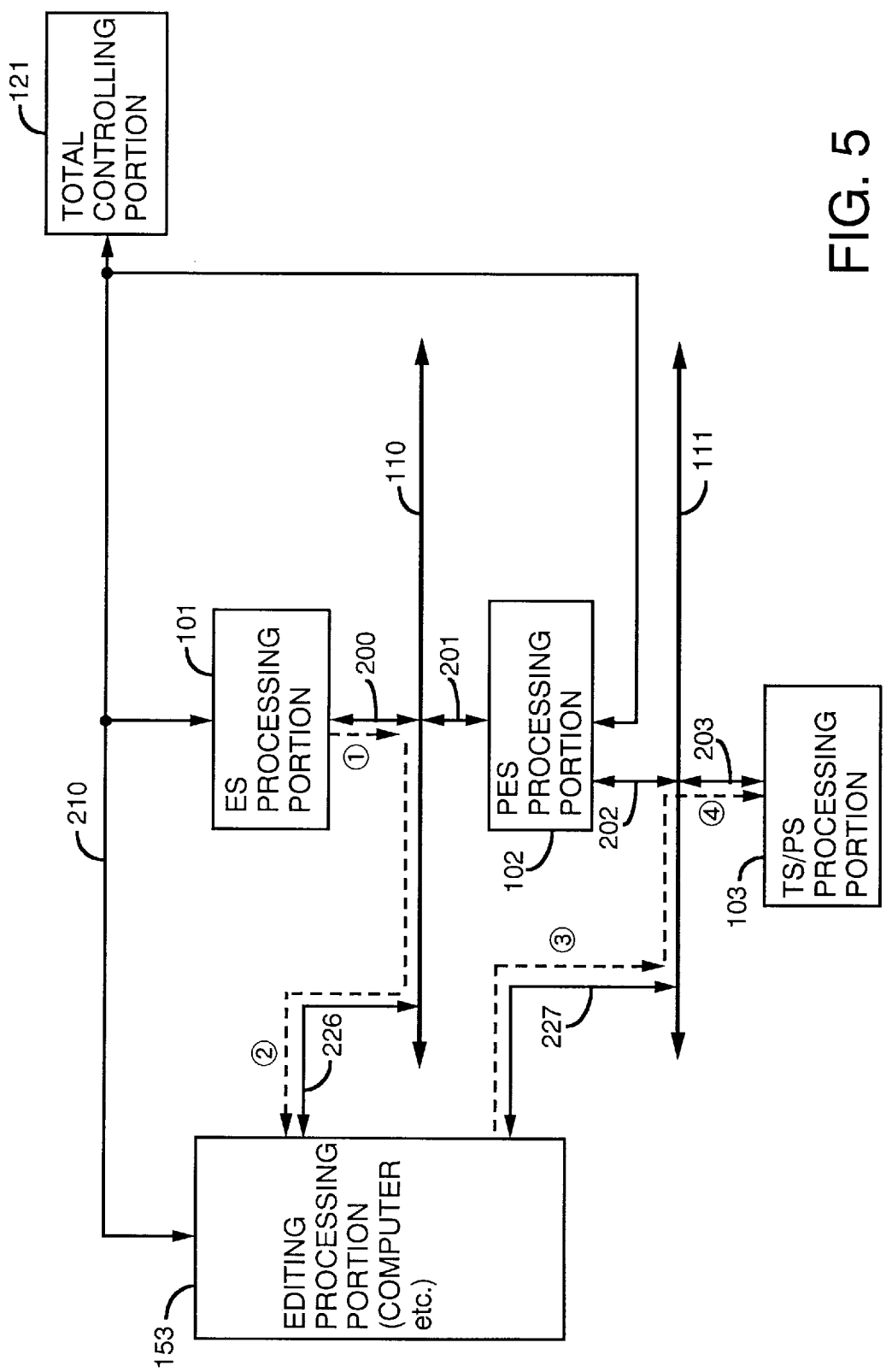
FIG. 5 is a block diagram showing a multimedia information processing apparatus of a fourth embodiment.

Next, a fourth embodiment of a multimedia information processing apparatus is explained which has another editing processing portion. FIG. 5 is a block diagram showing a multimedia information processing apparatus of embodiment 4. The elements having the same reference numbers in FIG. 5 are the same portions or the corresponding portions in FIG. 1. Accordingly the detailed explanation of the same portions is omitted. In FIG. 5, the multimedia information processing apparatus comprises an editing processing portion 153 comprised of a computer, a connection line 226 which connects the TS/PS bus 110 with the editing processing portion 153, a connection line 227 which connects the PES bus 111 with the editing processing portion 153.

Next, an operation of the fourth embodiment is explained below. For example, the editing processing portion 226 corresponds to a multimedia computer having an apparatus which enables to input the camera image and output the image data. For example, the ES processing portions 101, which comprises an input means such as a camera, an encoding means which encodes the inputted data, and a decoding means which decodes the encoded data, encodes data from the camera, transmits the encoded data to the editing processing portion 153, and the editing processing portion 153 enlarges or reduces images therein and transmits the processed data to the TS/PS processing portion 103, and then the TS/PS processing portion 103 assembles the data into packets and transmits them to the transmission line. In this case, the ES processing portions 101 encodes the image data and the voice data from the camera and transmits the data to the ES bus 110 vis ① in FIG. 5 in response to the total controlling portion 121, according to a predetermined format.

Next, the editing processing portion 153 receives the encoded data from the ES bus 110 via a route ② in FIG. 5, then re-decodes the data after editing process such as a predetermined enlargement and reduction, then adds a sub-information which carries out media identification and reproduction synchronization in the editing processing portion 153, then transmit the data to the PES bus 111 via the connection line 227 as shown in the route ③ in FIG. 5 in response to the instruction from the total controlling portion 121.

The TS/PS processing portions 103 assembles packets from the data received via the connection line 203 as shown in the route ④ in FIG. 5, and transmits the packet data to the transmission path processing portion 104 shown in FIG. 1.

As described above, in the multimedia information processing apparatus of the fourth embodiment, since the editing processing portion 153 can be connected with the ES processing portions 101 and the editing processing portion 153 can be connected with the TS/PS processing portions 103, the editing processing portion 153 is possible to edit the data from the ES processing portions 101. Further, the editing processing portion 153 can be connected to both the PES bus 111 and ES bus 110, the number of the bus access can be decreased, and therefore the other processing portions can use the buses efficiently.

For example, in a system which transmits the data to the TS/PS processing portions 103 after editing the data from the ES processing portion 110, if the editing processing portion 153 is connected to any one of the ES processing portion 110 or the PES bus 111 to input and output the data, the data from the ES processing portions 101 pass through for three times as follows.

(1) ES processing portions 101→editing processing portion 153 (use ES bus 110)

(2) editing processing portion 153→PES processing portions 102 (use ES bus 110)

(3) PES processing portions 102→PS processing portion 103 (use PES bus 111)

While, if the editing processing portion 153 is connected with both the ES bus 110 and the PES bus 111 as shown in this fourth embodiment, the data from the ES processing portions 101 pass through for two times as follows.

(1) ES processing portions 101→editing processing portion 153 (use ES bus 110)

(2) editing processing portion 153→TS/PS processing portions 103 (use ES bus 111)

Therefore, it is possible to use the bus efficiently.

In this fourth embodiment, although an example of a multimedia information processing apparatus is explained in which the editing processing portion 153 is connected to the ES bus 110 and the PES bus 111, if the editing processing portion 153 comprises the TS/PS processing portions 103, the editing processing portion 153 can be connected to TS/PS bus 112.

Embodiment 5

Figure 6:
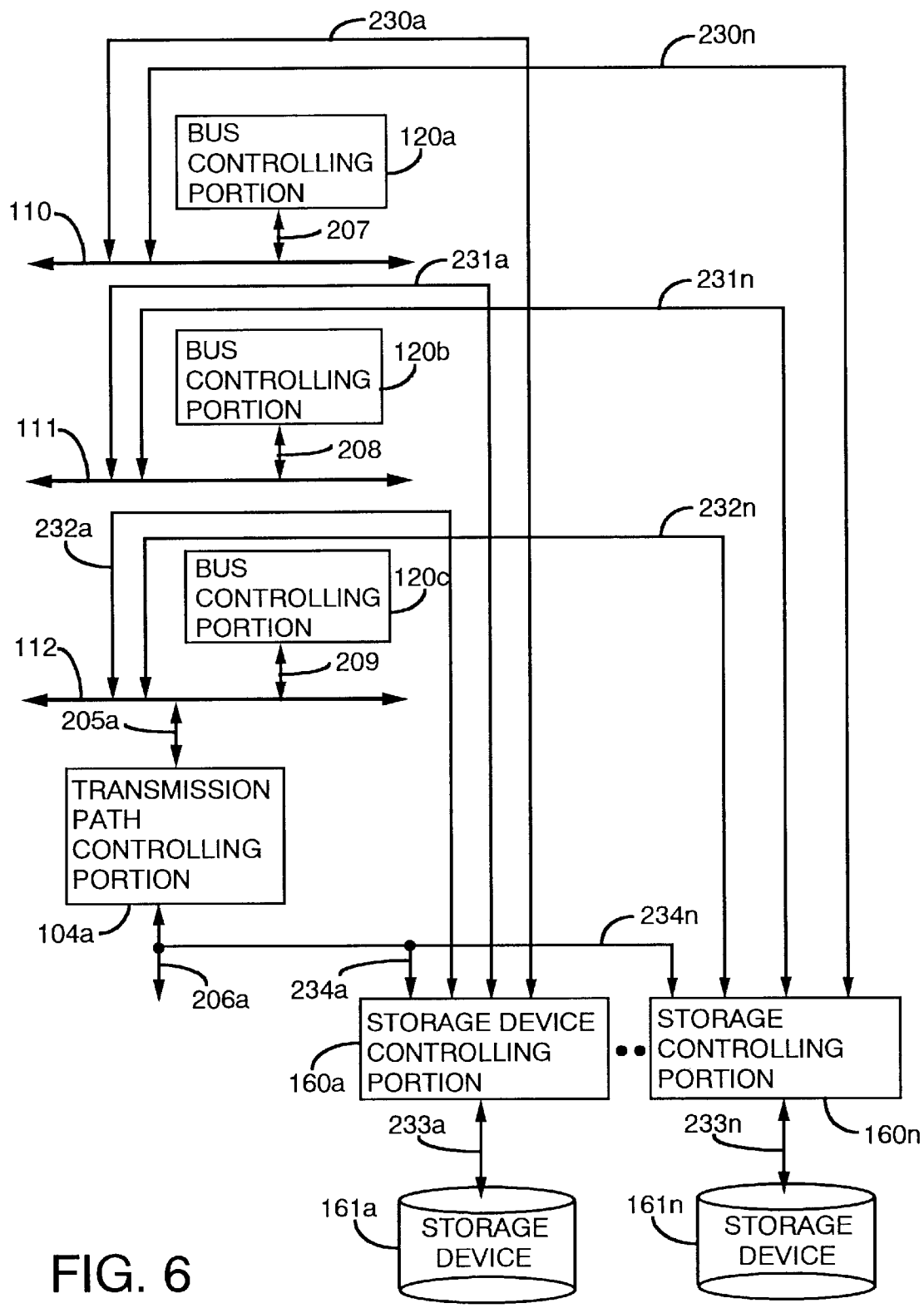
FIG. 6 is a block diagram showing a multimedia information processing apparatus of a fifth embodiment.

Next, a fifth embodiment of a multimedia information processing apparatus is explained which comprises a storage device which stores data according to a plurality of formats defined on the buses. FIG. 6 is a block diagram showing a multimedia information processing apparatus of the fifth embodiment. The elements having the same reference numbers in FIG. 6 are the same portions or the corresponding portions in FIG. 1. Accordingly the detailed explanation of the same portions is omitted. The multimedia information processing apparatus of FIG. 6 comprises storage device controlling portion 160a, . . . , 160n, storage devices 161a, . . . , 161n, connection lines 230a, . . . , 230n which receive and transmit control signals and data between the storage device controlling portions 160 and the ES bus 110, connection lines 231a, . . . , 231n which receive and transmit control signals and data between the storage device controlling portions 160 and the PES bus 111, connection lines 232a, . . . , 232n which receive and transmit control signals and data between the storage device controlling portions 160 and the PES bus 112, connection lines 233a, . . . , 233n which receive and transmit control signals and data between the storage device controlling portions 160 and the storage device 161, and connection lines 234a, . . . , 234n which receive a control signal and data between a transmission path processing portions 203 and the storage device controlling portions 160.

Next, an operation is explained using FIG. 6. The storage devices 161 are connected to the ES bus 110, the PES bus 111 and the TS/PS bus 112 via the storage device controlling portions 160. When access command is indicated from the total controlling portion 121 or each bus controlling portions 120, the storage device 161 transmits data to specified buses or writes data sent from the buses.

As described above, in the multimedia information processing apparatus of the fifth embodiment, the data are stored or data rate is changed using a plurality of formats on the bus. Therefore, it is possible that the ES processing portions 101 can access the stored data in the storage device 161 directly and also display the data on a monitor in the ES processing portions 101, or the TS/PS processing portions 103 can access the stored data in the storage device 161 directly and transmit the data via the transmission path processing portion 104, that is, it is possible to handle many kinds of data via the storage device.

Embodiment 6

Figure 7:
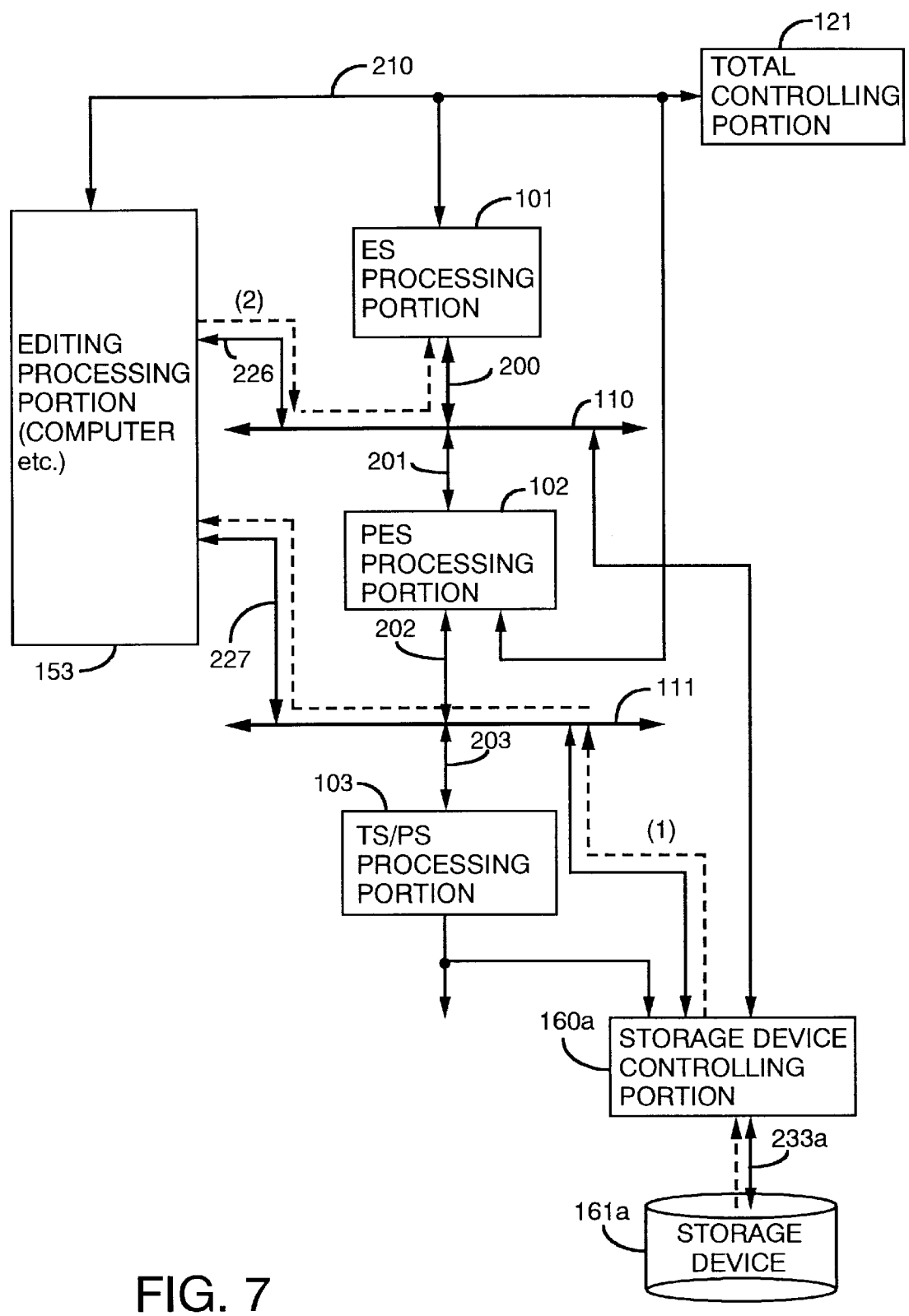
FIG. 7 is a block diagram showing a multimedia information processing apparatus of a sixth embodiment.

Next, a sixth embodiment of a multimedia information processing apparatus is explained which has another editing processing portion. FIG. 7 is a block diagram showing a multimedia information processing apparatus of the sixth embodiment. The elements having the same reference numbers in FIG. 7 are the same portions or the corresponding portions in FIG. 1 and FIG. 6. In FIG. 7, an editing processing portion 153 accesses the data to the storage device 161a and caries out editing therein. The sixth embodiment shows a case in which the image data etc. after editing is displayed at the display portion in the processing portion 101.

Next, an operation of the sixth embodiment is explained below. The editing processing portion 153 accesses the data stored in the storage device 161a in the format of the PES 170 shown in FIG. 2 and the read out data is inputted into the editing pressor 153 via the PES bus 111 as shown in the route (1) in FIG. 7. After the inputted data are processed in the editing processing portion 153, the data are inputted into the ES processing portions 101 via the ES bus 110 as shown in the route (2) in FIG. 7. An inputted data into the ES bus 101 are decoded by the ES processing portions 101 and displayed therein.

As described above, in the multimedia information processing apparatus of the sixth embodiment, it is possible to easily expand the editing function in a multimedia information processing apparatus.

Embodiment 7

Figure 8:
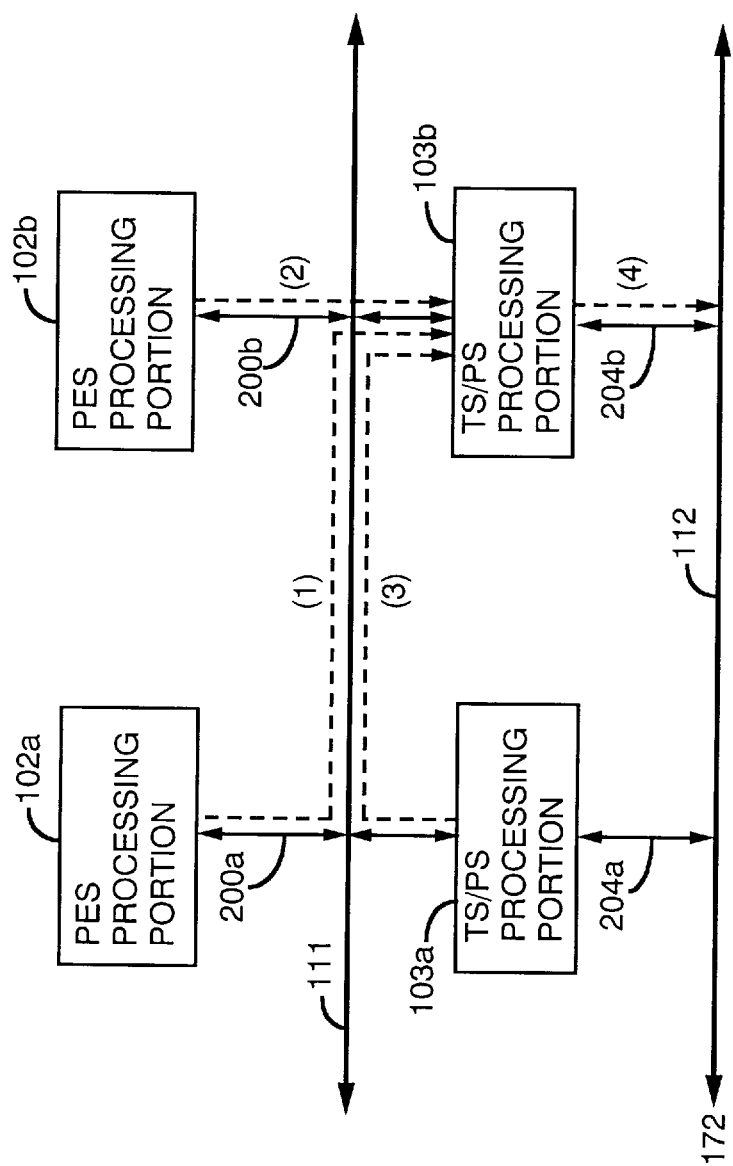
FIG. 8 is a block diagram showing a multimedia information processing apparatus of a seventh embodiment.
Figure 9:
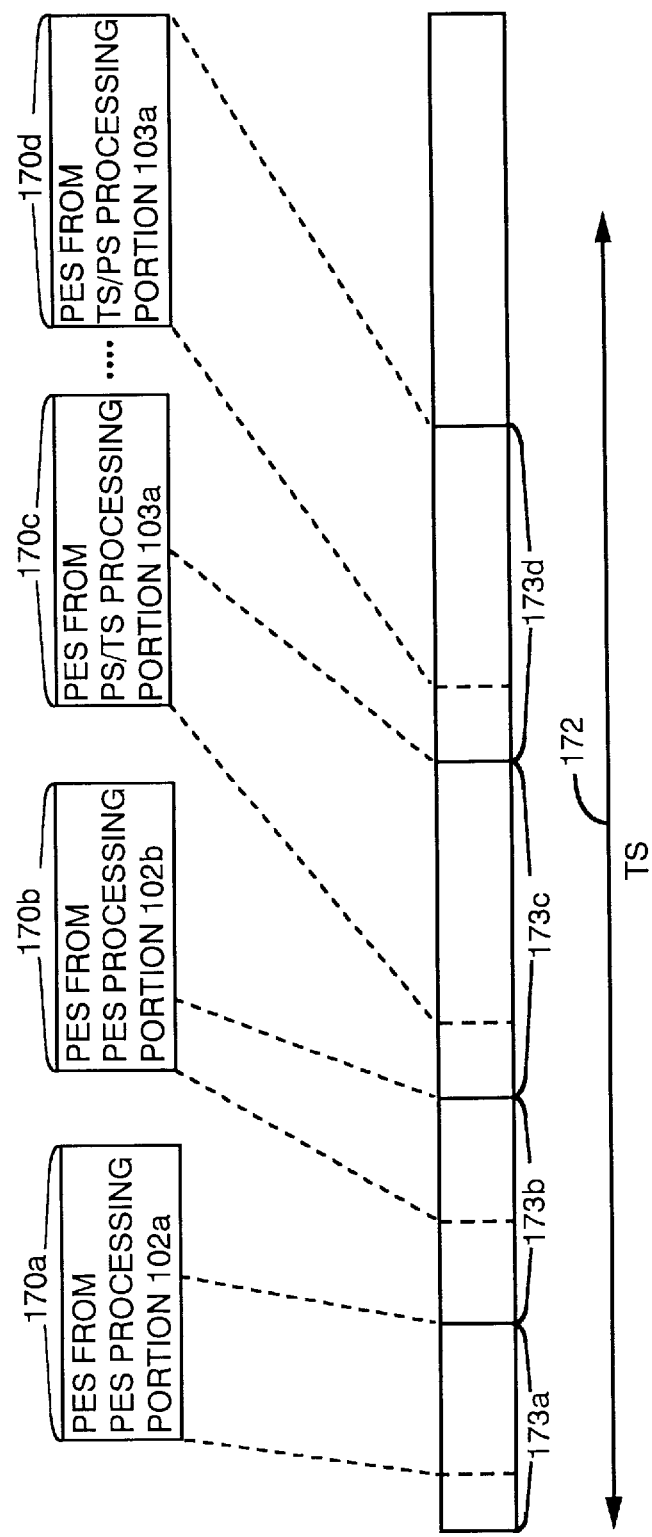
FIG. 9 is a block diagram showing a construction of multiplexed data of a multimedia information processing apparatus of a seventh embodiment.

Next, a seventh embodiment of a multimedia information processing apparatus is explained which multiplexes different kinds of media data and transmits them as multiplexed data. FIG. 8 is a block diagram showing a multimedia information processing apparatus and data flow. FIG. 9 is a construction of the multiplexed data of a multimedia information processing apparatus in the seventh embodiment. The elements having the same reference numbers in FIG. 8 and FIG. 9 are the same portions or the corresponding portions in FIG. 1 and FIG. 2. Accordingly the detailed explanation of the same portions is omitted. The construction of FIG. 8 and FIG. 9 is also the same as that of FIG. 1 and FIG. 2 except data flow.

Next, an operation is explained using FIG. 8 and FIG. 9. FIG. 8 shows an example of a processing in which the data flowing from the transmission path (for example, satellite etc.) and the data generated at the unit of the present invention are transmitted to other transmission path as one multiplexed data. The PES 170a from the PES processing portion 102a is inputted via the PES bus 111 (via route (1) in FIG. 8) into the TS/PS processing portion 103b. Similarly, the PES 170b from the PES processing portion 102b is inputted via the PES bus 111 (via route (2) in FIG. 8) into the TS/PS processing portion 103b. Similarly, a plurality of PES 170c and 170d from the TS/PS processing portion 103a are inputted via the PES bus 111 ( via route (3) in FIG. 8) into the TS/PS processing portion 103b. The TS/PS processing portion 103b assembles fixed length TS packets 173a, 173b, 173c and 173d using inputted data, and multiplexes these TS packets 173, and assembles a TS 172 and transmits it to the TS/PS bus 112.

As described above, a function in which the data flowing from the transmission path and the data generated at the inner unit are transmitted to other transmission path as one multiplexed data are added to the PES processing portions 102 and the TS/PS processing portions 103 in the multimedia information processing apparatus, it is possible to multiplex different data such as the data from a cable and the data from a computer and to transmit them as one multiplexed data. Accordingly, a receiver which has received this multiplexed data can receive different kinds of data from different media such as a satellite and a computer by decoding the one multiplexed data.

Embodiment 8

Figure 10:
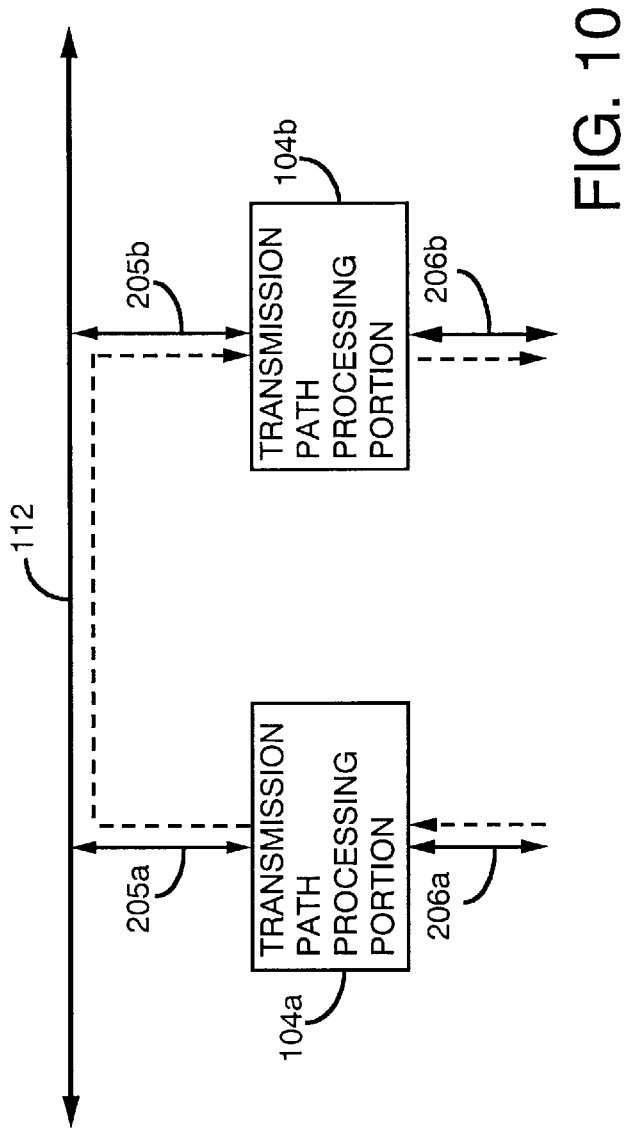
FIG. 10 is a block diagram showing a data flow a multimedia information processing apparatus of an eighth embodiment.

Next, an eighth embodiment of a multimedia information processing apparatus is explained in which data inputted from some media are transmitted to other media as data. FIG. 10 is a block diagram showing a multimedia information processing apparatus and data flow of the eighth embodiment. The construction of FIG. 10 is the same as that of FIG. 1 except data flow. The elements having the same reference numbers in FIG. 10 are the same portions or the corresponding portions in FIG. 1. Accordingly the detailed explanation of the same portions is omitted.

Next, an operation is explained using FIG. 10. The transmission path processing portion 104a receives the data 206a from a transmission path, for example, CATV, processes them and transmits them to the transmission path processing portion 104b via the TS/PS bus 112. The transmission path processing portion 104b processes the received data and transmits them to other transmission path, for example, to a satellite via the signal line 206b.

As described above, the multimedia information processing apparatus of the present embodiment can decode the data received from, for example, a cable and multiplexes them and transmits the data to the other transmission path, that is, the different media such as a satellite.

Embodiment 9

Figure 11:
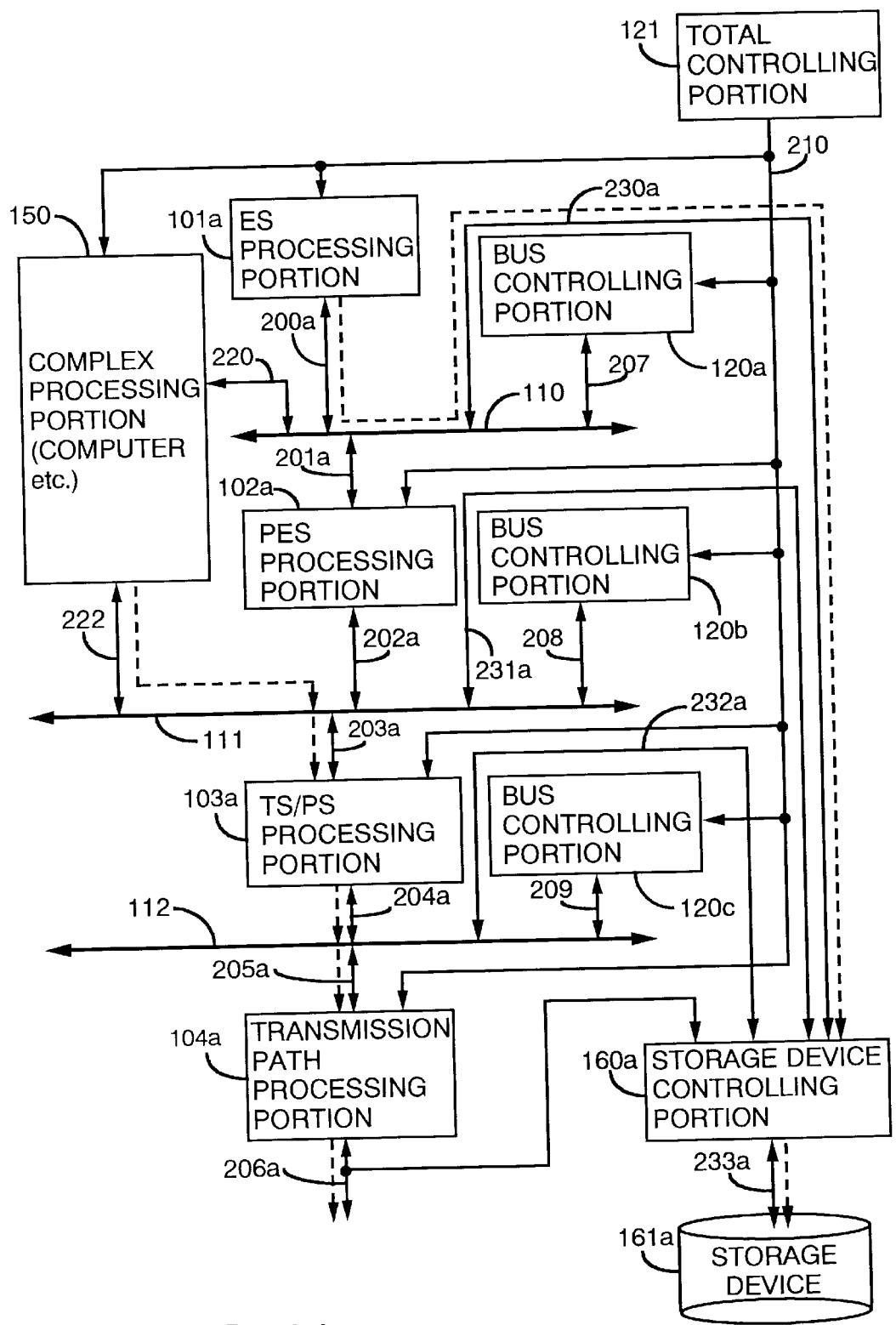
FIG. 11 is a block diagram showing data flow of a multimedia information processing apparatus of a ninth embodiment.

Next, a ninth embodiment of a multimedia information processing apparatus is explained in which a plurality of processings operates in parallel unless the buses compete to each other. FIG. 11 is a block diagram showing a multimedia information processing apparatus and data flow. The elements having the same reference numbers in FIG. 11 is the same portions or the corresponding portions in FIG. 1, FIG. 3 and FIG. 6. Accordingly the detailed explanation of the same portions is omitted.

Next, an operation is explained using FIG. 11. For example, in case the data from the ES processing portions 101 are written into the storage device 161, or the data from the complex processing portion 150 are transmitted to the TS/PS processing portion 103a, the total controlling portion 121 confirms the states of the ES bus 110 according to the information from the bus controlling portion 120a. If the ES bus 110 is not used, the total controlling portion 121 allows the ES processing portions 101 and the storage device 161 to access the ES bus 110. After the allowance, the ES processing portions 101 and the storage device 161 start to operate to access. In case of sending and receiving the data between the complex processing portion 150 and the PES processing portion 102a and between the complex processing portion 150 and the TS/PS processing portion 103a at the same time with the above confirmation, the total controlling portion 121 confirms states of the PES bus 111 and the TS/PS bus 112 according to the information from the bus controlling portion 120b and the bus controlling portion 120c. If both busses are not used, the total controlling portion 121 allows the complex processing portion 150, the PES processing portion 102a and the TS/PS processing portion 103a to access the buses. The complex processing portion 150, the PES processing portion 102a and the TS/PS processing portion 103a start to operate to access according to the allowance.

As described above, the total controlling portion 121 does not allow the complex processing portion 150 and so on to access the busses if the busses are used, and allows the complex processing portion 150 and so on to access the busses if the busses are not used. Therefore, a plurality of processings operate in parallel unless the buses compte to each other, and therefore, it is possible to obtain a multimedia information processing apparatus having a high processing ability.

Embodiment 10

Figure 12:
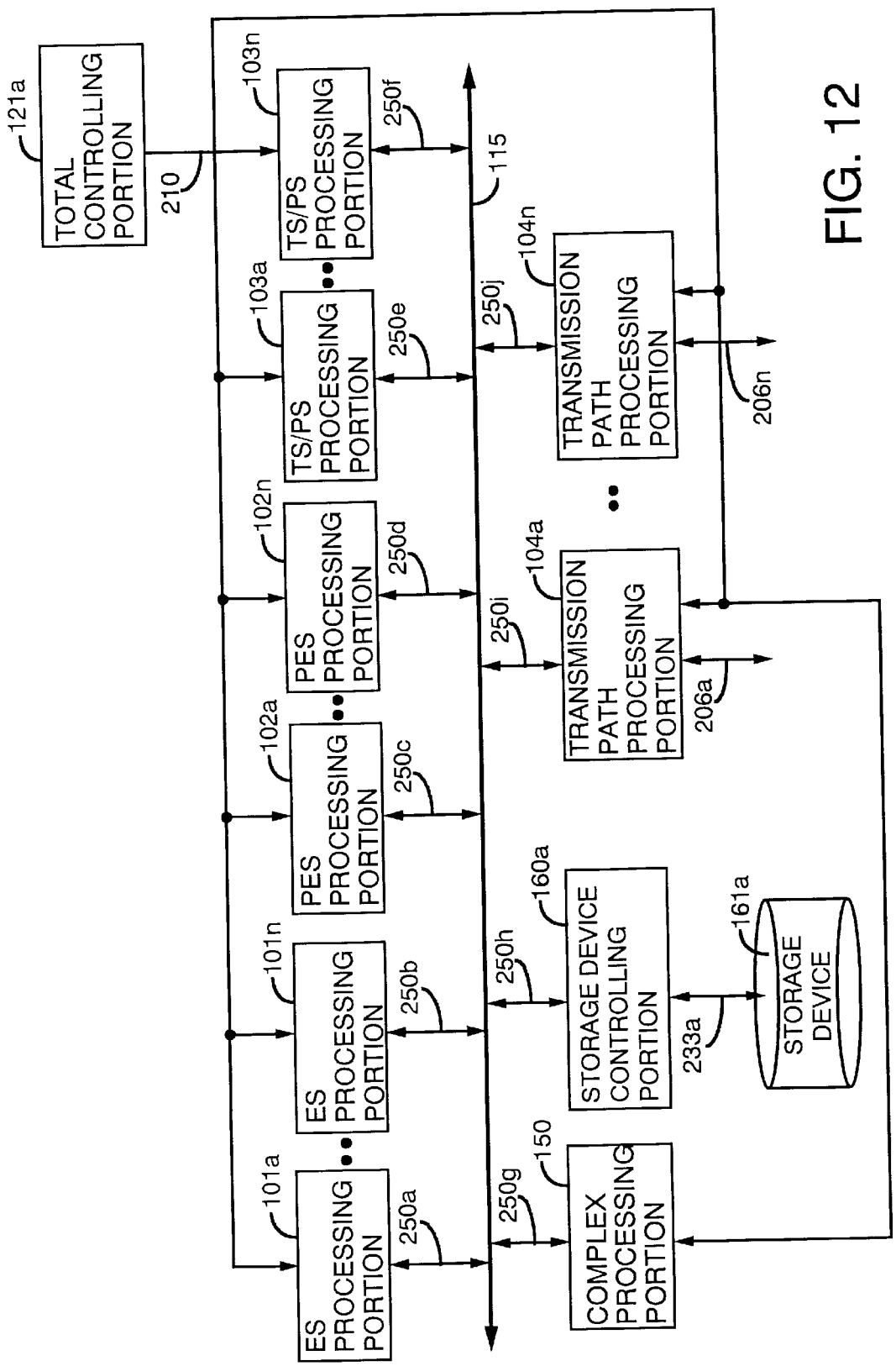
FIG. 12 is a block diagram showing a multimedia information processing apparatus of a tenth embodiment.

Next, an operation of other multimedia information processing apparatus of the tenth embodiment of the present invention is explained below. FIG. 12 is a block diagram showing a multimedia information processing apparatus of the present embodiment. The elements having the same reference numbers in FIG. 12 are the same portions or the corresponding portions in FIG. 1, FIG. 3 and FIG. 6. Accordingly the detailed explanation of the same portions is omitted. In FIG. 12, the multimedia information processing apparatus comprises a main bus, a total controlling portion 121a which manages operations of each processing portion and competition of the main bus 115, a connection lines 250 which connects each processing portion to the main bus.

Next, an operation of the tenth embodiment is explained below. In FIG. 12, the ES processing portions 101, the PES processing portions 102, the TS/PS processing portions 103, the transmission path processing portions 104 and the complex processing portion 150 are connected to the main bus 115 via the connection lines 250. For example, in case of writing the data from the ES processing portion 101a into the storage device 161a, the total controlling portion 121a manages states of the main bus 115, and if the main bus 115 is not used, the total controlling portion 121a allows the ES processing portion 101a and the storage device 161a to access the main bus 115. The ES processing portion 101a and the storage device 161a start to operate to access according to the allowance.

As mentioned above, when the multimedia information processing apparatus is constructed so that each processing portion which uses the main bus 115 obtains the right to access the main bus 115 from the total controlling portion 121a and starts to operate, the ES processing portions 101, the PES processing portions 102, the TS/PS processing portions 103, the transmission path processing portion 104 and the complex processing portion 150 access only one main bus 115, which realizes an economical and general purpose multimedia information processing apparatus.

In the present embodiment, although an example of a multimedia information processing apparatus is explained as shown in FIG. 12, in which respective processing portions such as the ES processing portions 101, the PES processing portions 102, the TS/PS processing portions 103, the transmission path processing portions 104 are connected to the main bus 115, it is not always necessary to comprise all of the processing portions shown in FIG. 12. It is possible that only processing portions or units having necessary function for intended use are connected to the main bus 115, and therefore the total controlling portion 121 can allow these processing portions or units to access the main bus 115.

Embodiment 11

Figure 13:
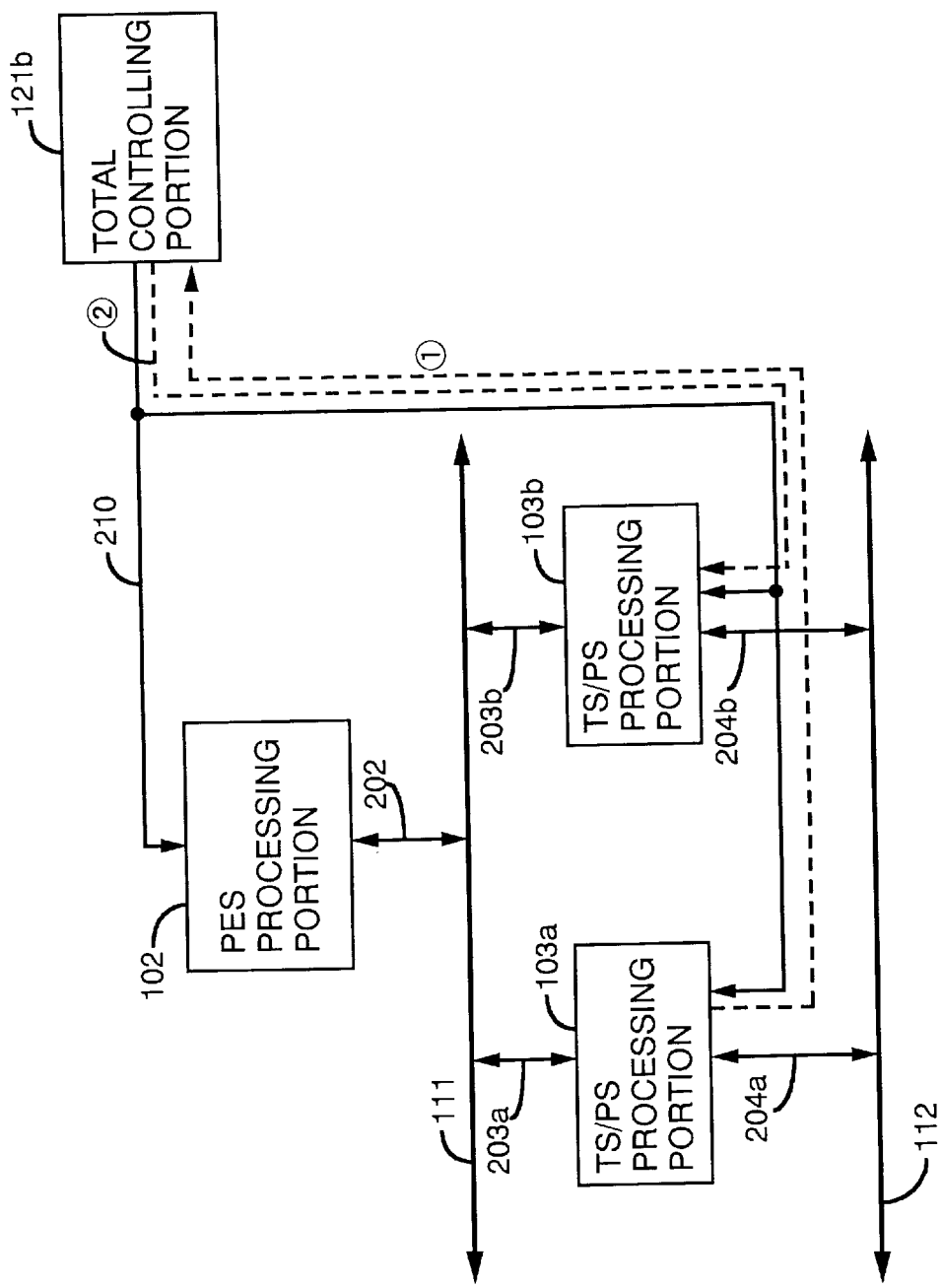
FIG. 13 is a block diagram showing a control of a double construction by a total controlling portion of an eleventh embodiment.
Figure 14:
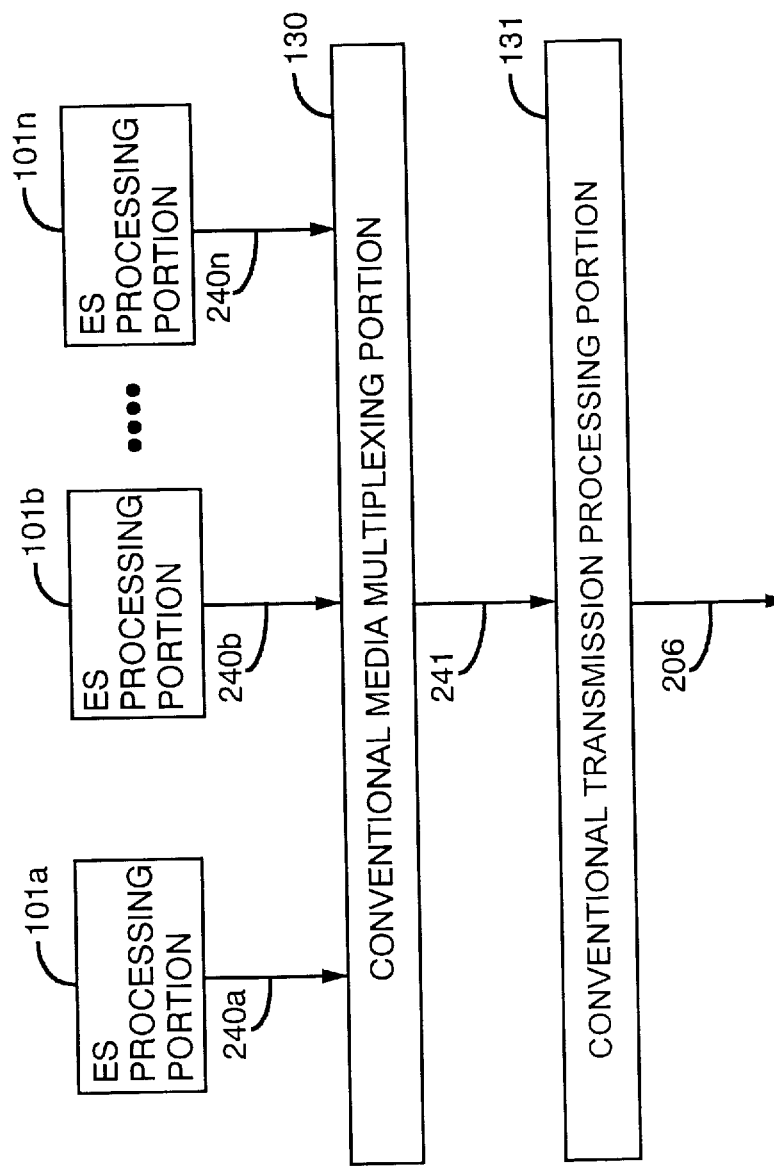
FIG. 14 is a block diagram showing a conventional multimedia processing portion.

Next, an eleventh embodiment of a multimedia information processing apparatus is explained in which processing portions other than the troubled processing portions operate when processing portions failed in the multimedia information processing apparatus. FIG. 13 is a block diagram showing a multimedia information processing apparatus of a thirteenth embodiment. The elements having the same reference numbers in FIG. 13 are the same portions or the corresponding portions in FIG. 1. Accordingly the detailed explanation of the same portions is omitted. In FIG. 13, a total controlling portion 121b controls the PES processing portions 102 and the TS/PS processing portions 103.

Next, an operation of the third embodiment is explained below. The total controlling portion 121b recognizes states of each processing portion by the control signal 210. For example, in case the PES processing portions 102 tries to communicate with the TS/PS processing portion 103a, the total controlling portion 121b confirms the states of the TS/PS processing portion 103a. If the TS/PS processing portion 103a has failed, a total controlling portion 121b detects the failure of the TS/PS processing portion 103a via the route ① in FIG. 13 and sends a command to the TS/PS processing portion 103b having the same function as that of the TS/PS processing portion 103a so that the TS/PS processing portion 103b begin to start via the route ② in FIG. 13.

As mentioned above, even if a fault has occurred in some processing portions, the multimedia information processing apparatus of the present invention is able to operate stably using multiplex construction provided with fault tolerance function where the processing portions operate in the same way.

What is claimed is:

1. A multimedia information processing apparatus comprising:

an information source processing means for encoding a media signal outputted from media for every media and for transmitting said media signal to a first bus as an information source encoded bit sequence;

an element packet processing means for receiving said information source encoded bit sequence from said first bus and for transmitting element packets which are added by a first sub-information including a media identification, a reproduction synchronization, a packet synchronization and so on to a second bus;

a multiplex processing means for generating fixed length packets added by second sub-information including a packet identification and a reference time by dividing said element packets inputted from said second bus, and for transmitting any one of a first multiplexed stream multiplexed by fixed length packets or a second multiplexed stream multiplexed by said element packets and added by said second sub-information to a third bus;

a transmission path processing portion for outputting said first or second multiplexed stream inputted from said third bus to a transmission path as a transmission signal according to a transmission media;

a control means for managing states of the buses from the first to the third and controlling said processing means; and at least any of a plurality of information source processing means, a plurality of element packet processing means, a plurality of multiplex processing means and a plurality of transmission path processing portions.

2. A multimedia information processing apparatus of claim 1, wherein, data format of signals transmitted to the buses from the first to the third is defined for every bus.

3. A multimedia information processing apparatus of claim 1 further comprising:

a storage means for receiving and transmitting data from/to any of transmission path processing means and the buses from the first to the third.

4. A multimedia information processing apparatus comprising:

a transmission path processing means, when a transmission signal outputted from a transmission media is received via transmission paths, for decoding said transmission signal according to characteristics of said transmission path, and for transmitting any one of a first multiplexed stream or a second multiplexed stream to a third bus, said first multiplexed stream is multiplexed by fixed length packets which are assembled by adding second sub-information including a packet identification and a reference time to said decoded transmission signal, and said second multiplexed stream is formed by multiplexing said element packets for every media and by adding said second sub-information;

a multiplex packet processing means for transmitting said element packets to a second bus, said element packets are formed by inputting and separating said multiplexed stream from said third bus, and adding a first sub-information including a media identification, a reproduction synchronization and a packet synchronization to the separated stream;

an element packet processing means for inputting said element packets from said second bus, separating said first sub-information and transmitting an information source encoded bit sequence to a first bus;

an information source processing means for inputting said information source encoded bit sequence to a first bus, encoding it for every media and for transmitting an information source data to the media;

a control means for managing states of the buses from the first to the third and for controlling said each processing means; and at least any of a plurality of information source processing means, a plurality of element packet processing means, a plurality of multiplex packet processing means and a plurality of transmission paths processing means.

5. A multimedia information processing apparatus comprising:

an information source processing means for encoding a media signal outputted from media for every media and for transmitting said media signal to a first bus as an information source encoded bit sequence, and when said information source encoded bit sequence is inputted from said first bus, for decoding an information source bit sequence for every media and transmitting them to said first bus;

an element packet processing means, when said information source encoded bit sequence is received from said first bus, for transmitting element packets, which are added by a first sub-information including a media identification, a reproduction synchronization, a packet synchronization and so on, to a second bus, and when said element packets are inputted from said second bus, for separating said first sub-information from said element packets and transmitting said information source encoded bit sequence to said first bus;

a multiplex packet processing means, when said element packets inputted from said second bus, for disassembling said element packets and generating fixed length packets added by second sub-information including a packet identification and a reference time, and for transmitting any one of a first multiplexed stream multiplexed by said fixed length packets or a second multiplexed stream multiplexed by said element packets and added by said second sub-information, to a third bus, when any one of said first or second multiplex stream is inputted from said third bus, for separating said first or second multiplexed stream and generating said element packets and for transmitting said element packets to a second bus, a transmission path processing portion when said first or second multiplexed stream is inputted from said third bus, for outputting said first or second multiplexed stream to a transmission path as a transmission signal according to the transmission media, when a transmission signal outputted from a transmission media is received via transmission paths, for decoding said transmission signal according to characteristics of said transmission paths, for decoding said transmission signal according to characteristics of said transmission path, and for generating fixed length packets which are assembled by adding sub-information including a packet identification and a reference time to said decoded transmission signal, and for transmitting said multiplexed stream to said third bus; and a control means for managing states of the buses from the first to the third and controlling said processing means; and at least any of a plurality of information source processing means, a plurality of element packet processing means, a plurality of multiplex packet processing means and a plurality of transmission path processing portions.

6. A multimedia information processing apparatus comprising:

an information source processing means for encoding a media signal outputted from media for every media and for transmitting said media signal to a first bus as an information source encoded bit sequence;

an element packet processing means for receiving said information source encoded bit sequence from said first bus and for transmitting element packets which are added by a first sub-information including a media identification, a reproduction synchronization, a packet snchronization and so on to a second bus;

a multiplex processing means for generating fixed length packets added by second sub-information including a packet identification and a reference time by dividing said element packets inputted from said second bus, and for transmitting any one of a first multiplexed stream multiplexed by fixed length packets or a second multiplexed stream multiplexed by said element packets and added by said second sub-information to a third bus;

a transmission path processing portion for outputting said first or second multiplexed stream inputted from said third bus to a transmission path as a transmission signal according to a transmission media;

a control means for managing states of the buses from the first to the third and controlling said processing means; and a complex processing means comprising at least two processing means among an information source processing means, an element packet processing means, a multiplexing packet means and a transmission path processing means;

wherein said complex processing means is connected to at least one of the buses from the first to the third.

7. A multimedia information processing apparatus comprising:

an information source processing means for encoding a media signal outputted from media for every media and for transmitting said media signal to a first bus as an information source encoded bit sequence;

an element packet processing means for receiving said information source encoded bit sequence from said first bus and for transmitting element packets which are added by a first sub-information including a media identification, a reproduction synchronization, a packet synchronization and so on to a second bus;

a multiplex processing means for generating fixed length packets added by second sub-information including a packet identification and a reference time by dividing said element packets inputted from said second bus, and for transmitting any one of a first multiplexed stream multiplexed by fixed length packets or a second multiplexed stream multiplexed by said element packets and added by said second sub-information to a third bus;

a transmission path processing portion for outputting said first or second multiplexed stream inputted from said third bus to a transmission path as a transmission signal according to a transmission media;

a control means for managing states of the buses from the first to the third and controlling said processing means; and an editing processing means for inputting data from any of the buses from the first to the third, for editing said inputted data, and for transmitting said edited data to the buses from the first to the third by a data format being appropriate to any of said buses.

8. A multimedia information processing apparatus comprising:

an information source processing means for encoding a media signal outputted from media for every media and for transmitting said media signal to a first bus as an information source encoded bit sequence;

an element packet processing means for receiving said information source encoded bit sequence from said first bus and for transmitting element packets which are added by a first sub-information including a media identification, a reproduction synchronization, a packet synchronization and so on to a second bus;

a multiplex processing means for generating fixed length packets added by second sub-information including a packet identification and a reference time by dividing said element packets inputted from said second bus, and for transmitting any one of a first multiplexed stream multiplexed by fixed length packets or a second multiplexed stream multiplexed by said element packets and added by said second sub-information to a third bus;

a transmission path processing portion for outputting said first or second multiplexed stream inputted from said third bus to a transmission path as a transmission signal according to a transmission media;

a control means for managing states of the buses from the first to the third and controlling said processing means; and an editing processing means connected to at least two buses among the buses from the first to the third, for editing said data inputted from one of said buses, and for converting said edited data into another data format being appropriate to said another bus, and for transmitting said edited data to said another bus.

9. A multimedia information processing apparatus comprising:

an information source processing means for encoding a media signal outputted from media for every media and for transmitting said media signal to a first bus as an information source encoded bit sequence, and when said information source encoded bit sequence is inputted from said first bus, for decoding an information source bit sequence for every media and transmitting them to said first bus;

an element packet processing means, when said information source encoded bit sequence is received from said first bus, for transmitting element packets, which are added by a first sub-information including a media identification, a reproduction synchronization, a packet synchronization and so on, to a second bus, and when said element packets are inputted from said second bus, for separating said first sub-information from said element packets and transmitting said information source encoded bit sequence to said first bus;

a multiplex packet processing means, when said element packets inputted from said second bus, for disassembling said element packets and generating fixed length packets added by second sub-information including a packet identification and a reference time, and for transmitting any one of a first multiplexed stream multiplexed by said fixed length packets or a second multiplexed stream multiplexed by said element packets and added by said second sub-information, to a third bus, when any one of said first or second multiplex stream is inputted from said third bus, for separating said first or second multiplexed stream and generating said element packets and for transmitting said element packets to a second bus, a transmission path processing portion when said first or second multiplexed stream is inputted from said third bus, for outputting said first or second multiplexed stream to a transmission path as a transmission signal according to the transmission media, when a transmission signal outputted from a transmission media is received via transmission paths, for decoding said transmission signal according to characteristics of said transmission paths, for decoding said transmission signal according to characteristics of said transmission path, and for generating fixed length packets which are assembled by adding sub-information including a packet identification and a reference time to said decoded transmission signal, and for transmitting said multiplexed stream to said third bus;

a control means for managing states of the buses from the first to the third and controlling said processing means; and a plurality of multiplexing packet processing means; wherein said multiplexing packet processing means inputs element packets which are sent to the second bus by some other multiplexing packet processing means, and transmits a first or second multiplexed stream to the third bus.

10. A multimedia information processing apparatus comprising:

an information source processing means for encoding a media signal outputted from media for every media and for transmitting said media signal to a first bus as an information source encoded bit sequence, and when said information source encoded bit sequence is inputted from said first bus, for decoding an information source bit sequence for every media and transmitting them to said first bus;

an element packet processing means, when said information source encoded bit sequence is received from said first bus, for transmitting element packets, which are added by a first sub-information including a media identification, a reproduction synchronization, a packet synchronization and so on, to a second bus, and when said element packets are inputted from said second bus, for separating said first sub-information from said element packets and transmitting said information source encoded bit sequence to said first bus;

a multiplex packet processing means, when said element packets inputted from said second bus, for disassembling said element packets and generating fixed length packets added by second sub-information including a packet identification and a reference time, and for transmitting any one of a first multiplexed stream multiplexed by said fixed length packets or a second multiplexed stream multiplexed by said element packets and added by said second sub-information, to a third bus, when any one of said first or second multiplex stream is inputted from said third bus, for separating said first or second multiplexed stream and generating said element packets and for transmitting said element packets to a second bus, a transmission path processing portion when said first or second multiplexed stream is inputted from said third bus, for outputting said first or second multiplexed stream to a transmission path as a transmission signal according to the transmission media, when a transmission signal outputted from a transmission media is received via transmission paths, for decoding said transmission signal according to characteristics of said transmission paths, for decoding said transmission signal according to characteristics of said transmission path, and for generating fixed length packets which are assembled by adding sub-information including a packet identification and a reference time to said decoded transmission signal, and for transmitting said multiplexed stream to said third bus;

a control means for managing states of the buses from the first to the third and controlling said processing means;

a plurality of transmission path processing means, when receiving a first or second multiplexed stream from the third bus, for transmitting said inputted multiplexed stream to a transmission path as a transmission signal according to a transmission media via said transmission path, for decoding said transmission signal according to characteristics of said transmission media, and for transmitting said first or second multiplexed stream to the third bus, and said first or second multiplexed stream is received and transmitted between said transmission path processing means via said third bus.

11. A multimedia information processing apparatus comprising:

an information source processing means for encoding a media signal outputted from media for every media and for transmitting said media signal to a first bus as an information source encoded bit sequence;

an element packet processing means for receiving said information source encoded bit sequence from said first bus and for transmitting element packets which are added by a first sub-information including a media identification, a reproduction synchronization, a packet synchronization and so on to a second bus;

a multiplex processing means for generating fixed length packets added by second sub-information including a packet identification and a reference time by dividing said element packets inputted from said second bus, and for transmitting any one of a first multiplexed stream multiplexed by fixed length packets or a second multiplexed stream multiplexed by said element packets and added by said second sub-information to a third bus;

a transmission path processing portion for outputting said first or second multiplexed stream inputted from said third bus to a transmission path as a transmission signal according to a transmission media;

a control means for managing states of the buses from the first to the third and controlling said processing means; and wherein said controlling means permits some of an information source processing means, an element packet processing means, a multiplexing packet processing means and a transmission processing means to operate in parallel provided that buses are not competed.

12. A multimedia information processing apparatus comprising:

an information source processing means for encoding a media signal outputted from media for every media and for transmitting said media signal to a first bus as an information source encoded bit sequence;

an element packet processing means for receiving said information source encoded bit sequence from said first bus and for transmitting element packets which are added by a first sub-information including a media identification, a reproduction synchronization, a packet synchronization and so on to a second bus;

a multiplex processing means for generating fixed length packets added by second sub-information including a packet identification and a reference time by dividing said element packets inputted from said second bus, and for transmitting any one of a first multiplexed stream multiplexed by fixed length packets or a second multiplexed stream multiplexed by said element packets and added by said second sub-information to a third bus;

a transmission path processing portion for outputting said first or second multiplexed stream inputted from said third bus to a transmission path as a transmission signal according to a transmission media;

a control means for managing states of the buses from the first to the third and controlling said processing means; and wherein a main bus is provided instead of the buses from the first to the third, to which an information source processing means, an element packet processing means, a multiplexing packet processing means and a transmission path processing means are connected; and said controlling means manages states of said main bus and controls each processing means.

13. A multimedia information processing apparatus comprising:

an information source processing means for encoding a media signal outputted from media for every media and for transmitting said media signal to a first bus as an information source encoded bit sequence;

an element packet processing means for receiving said information source encoded bit sequence from said first bus and for transmitting element packets which are added by a first sub-information including a media identification, a reproduction synchronization a packet synchronization and so on to a second bus;

a multiplex processing means for generating fixed length packets added by second sub-information including a packet identification and a reference time by dividing said element packets inputted from said second bus, and for transmitting any one of a first multiplexed stream multiplexed by fixed length packets or a second multiplexed stream multiplexed by said element packets and added by said second sub-information to a third bus;

a transmission path processing portion for outputting said first or second multiplexed stream inputted from said third bus to a transmission path as a transmission signal according to a transmission media;

a control means for managing states of the buses from the first to the third and controlling said processing means; and wherein a main bus is provided instead of the buses from the first to the third, to which an information source processing means, an element packet processing means, a multiplexing packet processing means and a transmission path processing means are connected; and further comprising:

an editing means which is connected to said main bus, said editing means edits data which are sent to said main bus from a complex processing means which carries out functions fro an information source processing means and an element packet processing means, or from said information source processing means, and transmits edited data to said main bus; and said controlling means manages states of said main bus and controls each processing means.

14. A multimedia information processing apparatus comprising:

an information source processing means for encoding a media signal outputted from media for every media and for transmitting said media signal to a first bus as an information source encoded bit sequence:

an element packet processing means for receiving said information source encoded bit sequence from said first bus and for transmitting element packets which are added by a first sub-information including a media identification, a reproduction synchronization, a packet synchronization and so on to a second bus;

a multiplex processing means for generating fixed length packets added by second sub-information including a packet identification and a reference time by dividing said element packets inputted from said second bus, and for transmitting any one of a first multiplexed stream multiplexed by fixed length packets or a second multiplexed stream multiplexed by said element packets and added by said second sub-information to a third bus;

a transmission path processing portion for outputting said first or second multiplexed stream inputted from said third bus to a transmission path as a transmission signal according to a transmission media;

a control means for managing states of the buses from the first to the third and controlling said processing means; and wherein a main bus is provided instead of the buses from the first to the third, to which an information source processing means, an element packet processing means, a multiplexing packet processing means and a transmission path processing means are connected; and further comprising:

a storage means for receiving and transmitting data between said main bus and any one of an information source processing means, an element packet processing means, a multiplexing packet processing and a transmission path processing means, via said main bus.

15. A multimedia information processing apparatus comprising:

an information source processing means for encoding a media signal outputted from media for every media and for transmitting said media signal to a first bus as an information source encoded bit sequence;

an element packet processing means for receiving said information source encoded bit sequence from said first bus and for transmitting element packets which are added by a first sub-information including a media identification, a reproduction synchronization, a packet synchronization and so on to a second bus;

a multiplex processing means for generating fixed length packets added by second sub-information including a packet identification and a reference time by dividing said element packets inputted from said second bus, and for transmitting any one of a first multiplexed stream multiplexed by fixed length packets or a second multiplexed stream multiplexed by said element packets and added by said second sub-information to a third bus;

a transmission path processing portion for outputting said first or second multiplexed stream inputted from said third bus to a transmission path as a transmission signal according to a transmission media;

a control means for managing states of the buses from the first to the third and controlling said processing means;

at least a plurality of any one of an information source processing means, an element packet processing means, a multiplexing packet processing means and a transmission processing means, said plurality of processing means have the same functions; and a control means for monitoring normal operation of said each processing means, and switches to another processing means which has the same function as that of the failed processing means if any one of processing means is failed.

* * * * *